(12) United States Patent
Hendry et al.

(10) Patent No.: US 11,785,245 B2
(45) Date of Patent: Oct. 10, 2023

(54) IMAGE ENCODING/DECODING METHOD AND DEVICE ON BASIS OF WRAP-AROUND MOTION COMPENSATION, AND RECORDING MEDIUM STORING BITSTREAM

(71) Applicant: LG Electronics Inc., Seoul (KR)

(72) Inventors: Hendry Hendry, Seoul (KR); Seethal Paluri, Seoul (KR); Seung Hwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/952,727

(22) Filed: Sep. 26, 2022

(65) Prior Publication Data

US 2023/0021409 A1    Jan. 26, 2023

Related U.S. Application Data

(63) Continuation of application No. PCT/KR2021/003791, filed on Mar. 26, 2021.
(Continued)

(51) Int. Cl.
*H04N 19/55* (2014.01)
*H04N 19/513* (2014.01)
(Continued)

(52) U.S. Cl.
CPC ......... *H04N 19/513* (2014.11); *H04N 19/105* (2014.11); *H04N 19/176* (2014.11); *H04N 19/46* (2014.11)

(58) Field of Classification Search
None
See application file for complete search history.

(56) References Cited

U.S. PATENT DOCUMENTS 11,368,708 B2 * 6/2022 Choi ................. H04N 19/184
11,418,804 B2 * 8/2022 Choi ................. H04N 19/51
(Continued)

FOREIGN PATENT DOCUMENTS

KR    20180056730    5/2018
WO    WO2020050752    3/2020

OTHER PUBLICATIONS

Brass, "Versatile Video Coding (Draft 8)," JVET-Q2001-vE, Presented at Joint Video Experts Team (JVET) of ITU-T SG 16 WP 3 and ISO/IEC JTC 1/SC 29/WG 11, 17th Meeting: Brussels, BE, Jan. 7-17, 2020, 511 pages.
(Continued)

*Primary Examiner* — Christopher G Findley
(74) *Attorney, Agent, or Firm* — Fish & Richardson P.C.

(57) ABSTRACT

An image encoding/decoding method and apparatus are provided. An image decoding method performed by an image decoding apparatus comprises obtaining inter prediction information of a current block and wraparound information from a bitstream, and generating a prediction block of the current block based on the inter prediction information and the wraparound information. The wraparound information may comprise a first flag specifying whether wraparound motion compensation is enabled for a current picture including the current block. Based on the first flag having a predetermined value specifying that the wraparound motion compensation is enabled for the current picture, the prediction block may be generated by performing the wraparound motion compensation, and the wraparound motion compensation may be performed based on either boundaries of a current subpicture including the current block or boundaries of a reference picture of the current block, based on whether the current subpicture is independently coded or not.

4 Claims, 18 Drawing Sheets

Related U.S. Application Data

(60) Provisional application No. 63/009,980, filed on Apr. 14, 2020, provisional application No. 63/000,474, filed on Mar. 26, 2020.

(51) Int. Cl.
*H04N 19/105* (2014.01)
*H04N 19/176* (2014.01)
*H04N 19/46* (2014.01)

(56) References Cited

U.S. PATENT DOCUMENTS

| | | | |
|---|---|---|---|
| 2021/0160482 A1* | 5/2021 | Chiu | H04N 19/59 |
| 2021/0185340 A1* | 6/2021 | Chen | H04N 19/176 |
| 2021/0203972 A1* | 7/2021 | Chen | H04N 19/70 |
| 2021/0297704 A1* | 9/2021 | Chang | H04N 19/82 |

OTHER PUBLICATIONS

He et al., "[AHG9/AHG12] On subpicture wrap around offset signaling," JVET-Q0212, Presented at Joint Video Experts Team (JVET) of ITU-T SG 16 WP 3 and ISO/IEC JTC 1/SC 29/WG 11, 17th Meeting: Brussels, BE, Jan. 7-17, 2020, 8 pages.

* cited by examiner

FIG. 9

| seq_parameter_set_rbsp( ) { | Descriptor |
|---|---|
|    sps_seq_parameter_set_id | u(4) |
|    ... | |
|    subpic_info_present_flag | u(1) |
|    if( subpic_info_present_flag ) { | |
|       sps_num_subpics_minus1 | ue(v) |
|       sps_independent_subpics_flag | u(1) |
|       for( i = 0; sps_num_subpics_minus1 > 0 && i <= sps_num_subpics_minus1; i++ ) { | |
|          if( i > 0 && pic_width_max_in_luma_samples > CtbSizeY ) | |
|             subpic_ctu_top_left_x[ i ] | u(v) |
|          if( i > 0 && pic_height_max_in_luma_samples > CtbSizeY ) { | |
|             subpic_ctu_top_left_y[ i ] | u(v) |
|          if( i < sps_num_subpics_minus1 && | |
|             pic_width_max_in_luma_samples > CtbSizeY ) | |
|             subpic_width_minus1[ i ] | u(v) |
|          if( i < sps_num_subpics_minus1 && | |
|             pic_height_max_in_luma_samples > CtbSizeY ) | |
|             subpic_height_minus1[ i ] | u(v) |
|          if( !sps_independent_subpics_flag) { | |
|             subpic_treated_as_pic_flag[ i ] | u(1) |
|             loop_filter_across_subpic_enabled_flag[ i ] | u(1) |
|          } | |
|       } | |
|       sps_subpic_id_len_minus1 | ue(v) |
|       subpic_id_mapping_explicitly_signalled_flag | u(1) |
|       if( subpic_id_mapping_explicitly_signalled_flag ) { | |
|          subpic_id_mapping_in_sps_flag | u(1) |
|          if( subpic_id_mapping_in_sps_flag ) | |
|             for( i = 0; i <= sps_num_subpics_minus1; i++ ) | |
|                sps_subpic_id[ i ] | u(v) |
|       } | |
|    } | |
|    ... | |
| } | |

FIG. 14a

| seq_parameter_set_rbsp( ) { | Descriptor |
|---|---|
| ... | |
|    sps_ref_wraparound_enabled_flag | u(1) |
| ... | |
| } | |

FIG. 14b

| pic_parameter_set_rbsp( ) { | Descriptor |
|---|---|
| ... | |
|    pps_ref_wraparound_enabled_flag | u(1) |
|    if( pps_ref_wraparound_enabled_flag ) | |
|      pps_ref_wraparound_offset | ue(v) |
| ... | |
| } | |

FIG. 18

| | Descriptor |
|---|---|
| seq_parameter_set_rbsp( ) { | |
|   sps_seq_parameter_set_id | u(4) |
|   ... | |
|   sps_ref_wraparound_enabled_flag | u(1) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( !sps_ref_wraparound_enabled_flag ) { | |
|         if( i > 0 && pic_width_max_in_luma_samples > CtbSizeY ) | |
|           subpic_ctu_top_left_x[ i ] | u(v) |
|         if( i > 0 && pic_height_max_in_luma_samples > CtbSizeY ) { | |
|           subpic_ctu_top_left_y[ i ] | u(v) |
|         if( i < sps_num_subpics_minus1 && | |
|           pic_width_max_in_luma_samples > CtbSizeY ) | |
|           subpic_width_minus1[ i ] | u(v) |
|       } | |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag ) { | |
|         subpic_treated_as_pic_flag[ i ] | u(1) |
|         loop_filter_across_subpic_enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for( i = 0; i <= sps_num_subpics_minus1; i++ ) | |
|           sps_subpic_id[ i ] | u(v) |
|     } | |
|   } | |

1810 brackets the block from `if( !sps_ref_wraparound_enabled_flag )` through its closing brace.

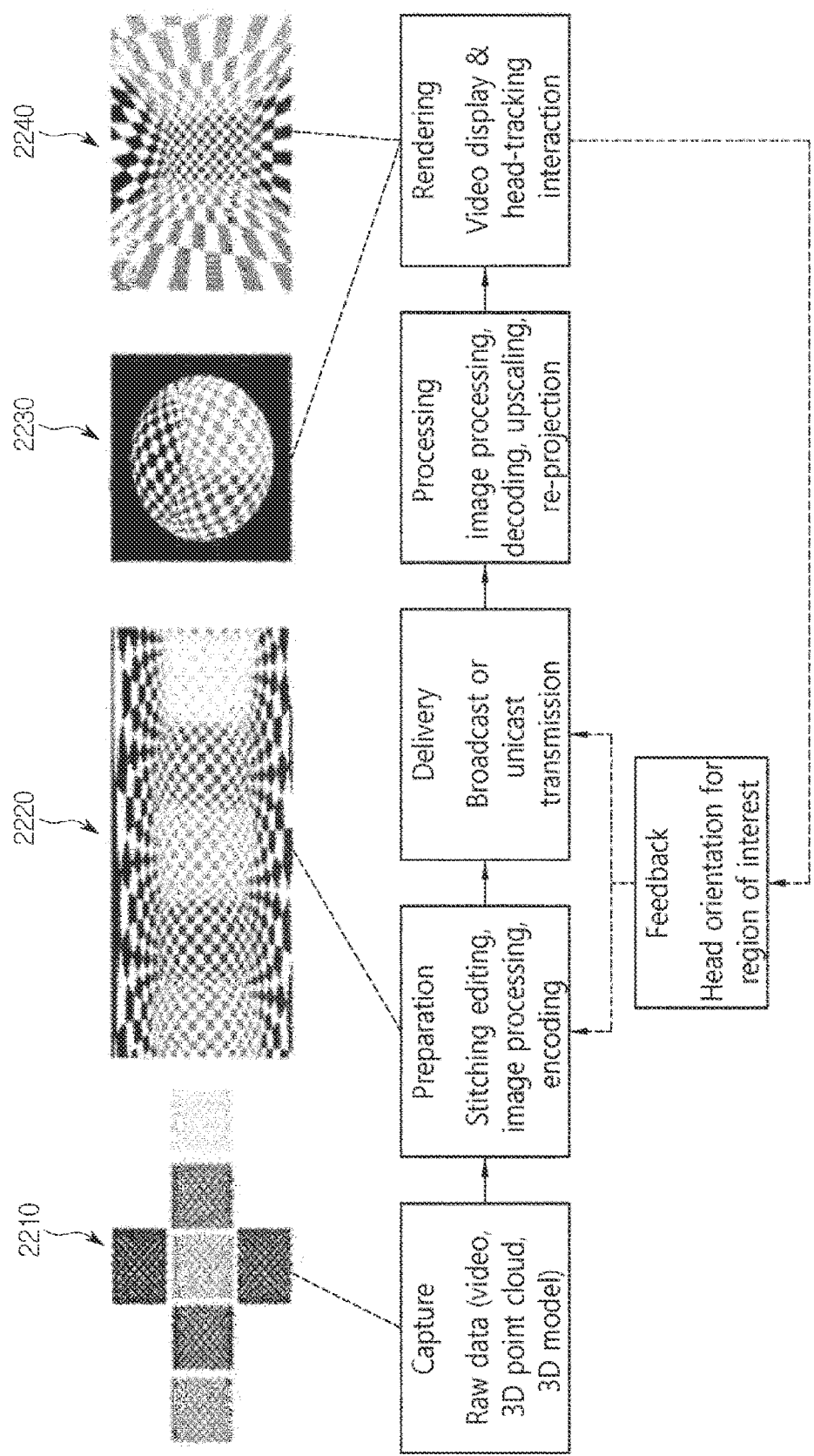

IMAGE ENCODING/DECODING METHOD AND DEVICE ON BASIS OF WRAP-AROUND MOTION COMPENSATION, AND RECORDING MEDIUM STORING BITSTREAM

CROSS-REFERENCE TO RELATED APPLICATIONS

Pursuant to 35 U.S.C. § 119(e), this application is a continuation of International Application PCT/KR2021/003791, with an international filing date of Mar. 26, 2021, which claims the benefit of U.S. Provisional Patent Application No. 63/000,474, filed on Mar. 26, 2020, and U.S. Provisional Patent Application No. 63/009,980, filed on Apr. 14, 2020, the contents of which are hereby incorporated by reference herein in their entirety.

TECHNICAL FIELD

The present disclosure relates to an image encoding/decoding method and apparatus, and, more particularly, to an image encoding and decoding method and apparatus based on wraparound motion compensation, and a recording medium storing a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

Another object of the present disclosure is to provide an image encoding/decoding method and apparatus based on wraparound motion compensation.

Another object of the present disclosure is to provide an image encoding/decoding method and apparatus based on wraparound motion compensation for an independently coded subpicture.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure comprises obtaining inter prediction information of a current block and wraparound information from a bitstream, and generating a prediction block of the current block based on the inter prediction information and the wraparound information. The wraparound information may comprise a first flag specifying whether wraparound motion compensation is enabled for a current picture including the current block. Based on the first flag having a predetermined value specifying that the wraparound motion compensation is enabled for the current picture, the prediction block may be generated by performing the wraparound motion compensation, and the wraparound motion compensation may be performed based on either boundaries of a current subpicture including the current block or boundaries of a reference picture of the current block, based on whether the current subpicture is independently coded or not.

An image decoding apparatus according to another aspect of the present disclosure comprises a memory and at least one processor. The at least one processor may be configured to obtain inter prediction information of a current block and wraparound information from a bitstream, and generate a prediction block of the current block based on the inter prediction information and the wraparound information. The wraparound information may comprise a first flag specifying whether wraparound motion compensation is enabled for a current picture including the current block. Based on the first flag having a predetermined value specifying that the wraparound motion compensation is enabled for the current picture, the prediction block may be generated by performing the wraparound motion compensation, and the wraparound motion compensation may be performed based on either boundaries of a current subpicture including the current block or boundaries of a reference picture of the current block, based on whether the current subpicture is independently coded or not.

An image encoding method according to another aspect of the present disclosure comprises determining whether wraparound motion compensation is applied for a current block, generating a prediction block of the current block by performing inter prediction based on the determination, and encoding inter prediction information of the current block and wraparound information for the wraparound motion compensation. The wraparound information may comprise a first flag specifying whether wraparound motion compensation is enabled for a current picture including the current block, and the wraparound motion compensation may be performed based on either boundaries of a current subpicture including the current block or boundaries of a reference picture of the current block, based on whether the current subpicture is independently coded or not.

In addition, a computer-readable recording medium according to another aspect of the present disclosure may store the bitstream generated by the image encoding apparatus or the image encoding method of the present disclosure.

In addition, a transmission method according to another aspect of the present disclosure may transmit a bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus based on wraparound motion compensation.

Also, according to the present disclosure, it is possible to provide an image encoding/decoding method and apparatus based on wraparound motion compensation for an independently coded subpicture.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 9 is a view showing an example of an SPS including information on a subpicture.

FIG. 14a is a view illustrating an example of an SPS including information on wraparound motion compensation.

FIG. 14b is a view illustrating an example of a PPS including information on wraparound motion compensation.

FIG. 18 is a view showing an example of a SPS according to an embodiment of the present disclosure.

FIG. 22 is a view schematically illustrating architecture for providing a three-dimensional image/video service in which embodiment(s) of the present disclosure may be utilized.

DETAILED DESCRIPTION

Figure 1:
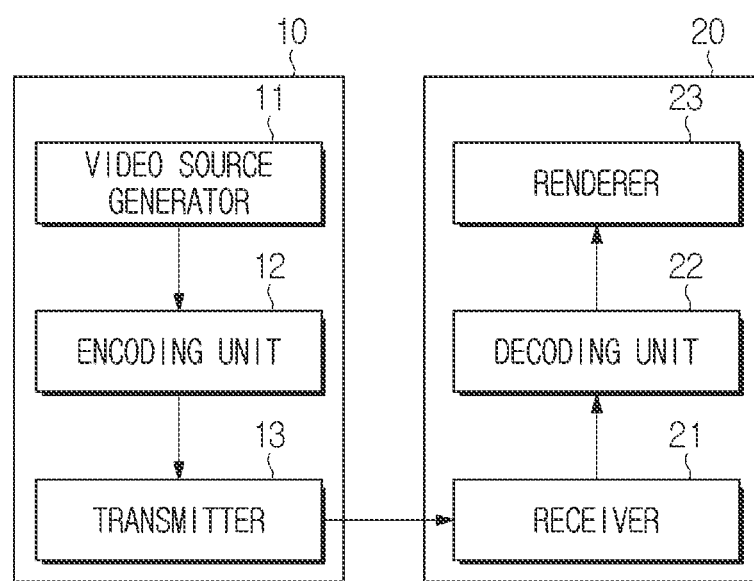
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block". In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a schematic view illustrating a video coding system, to which an embodiment of the present disclosure is applicable.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
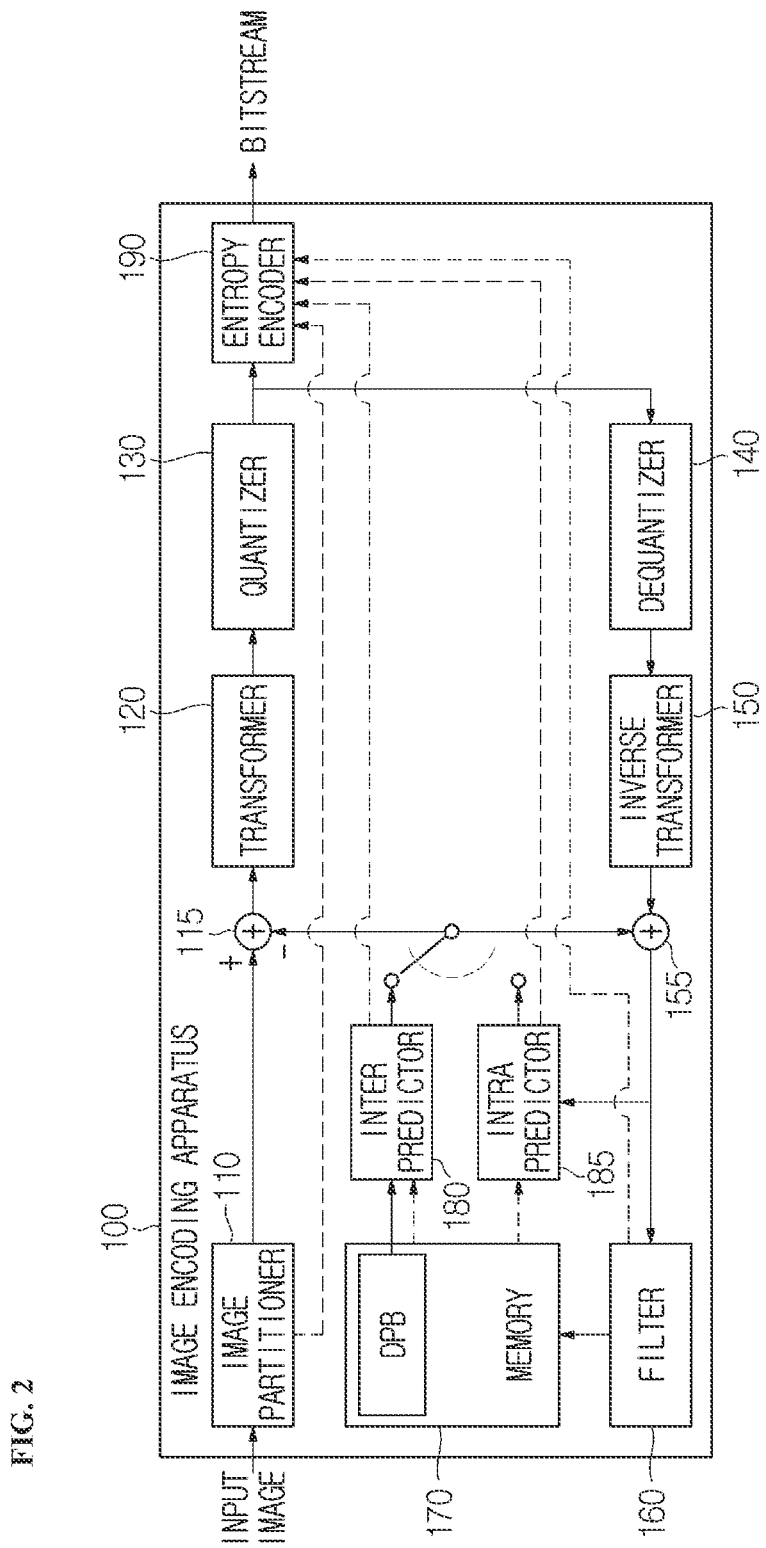
FIG. 2 is a view schematically illustrating an image encoding apparatus, to which an embodiment of the present disclosure is applicable.

FIG. 2 is a view schematically illustrating an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction. L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
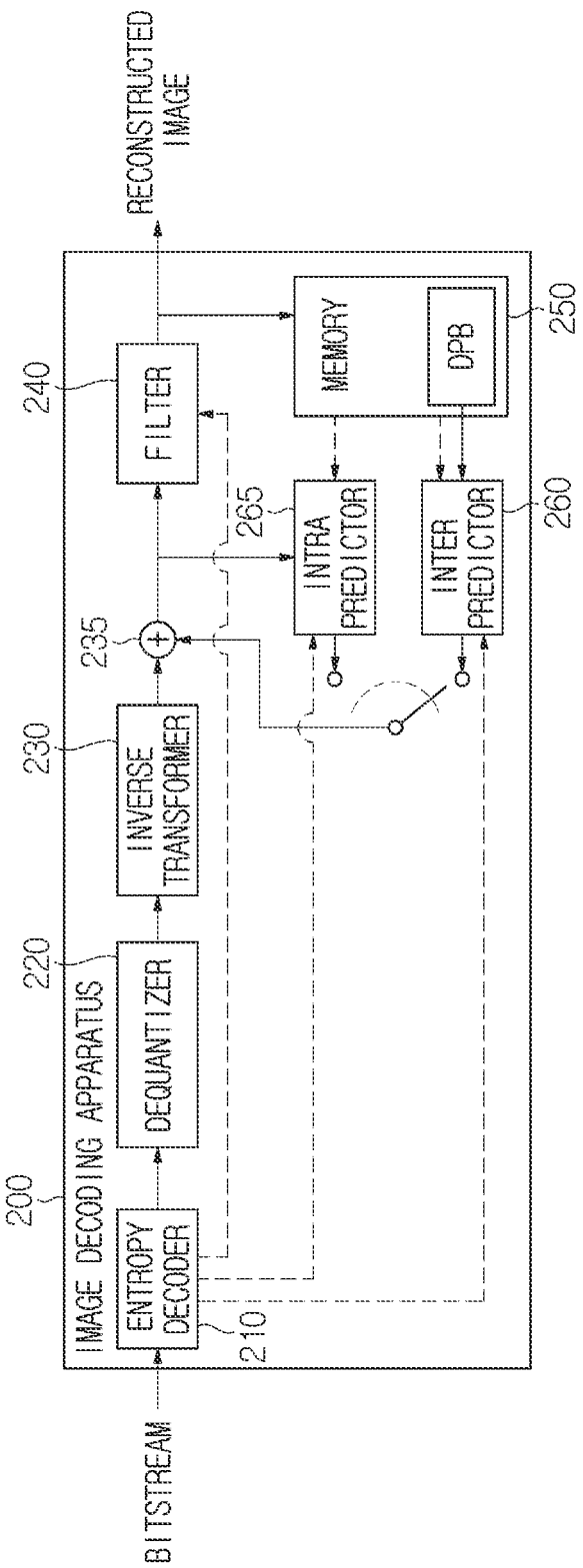
FIG. 3 is a view schematically illustrating an image decoding apparatus, to which an embodiment of the present disclosure is applicable.

FIG. 3 is a view schematically illustrating an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200.

Overview of Inter Prediction

Hereinafter, inter prediction according to the present disclosure will be described.

The predictor of an image encoding apparatus/image decoding apparatus according to the present disclosure may perform inter prediction in units of blocks to derive a prediction sample. Inter prediction may be a prediction derived in a manner that is dependent on data elements (e.g., sample values, motion information, etc.) of picture(s) other than a current picture. When inter prediction is applied to the current block, a predicted block (prediction block or a prediction sample array) for the current block may be derived based on a reference block (reference sample array) specified by a motion vector on a reference picture indiated by a reference picture index. In this case, in order to reduce the amount of motion information transmitted in an inter prediction mode, motion information of the current block maybe predicted in units of blocks, subblocks or samples, based on correlation of motion information between a neighboring block and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block present in the current picture and a temporal neighboring block present in the reference picture. The reference picture including the reference block and the reference picture including the temporal neighboring block may be the same or different. The temporal neighboring block may be referred to as a collocated reference block, collocated CU (ColCU) or colBlock, and the reference picture including the temporal neighboring block may be referred to as a collocated picture (colPic) or colPicture. For example, a motion information candidate list may be constructed based on the neighboring blocks of the current block, and flag or index information indicating which candidate is selected (used) may be signaled in order to derive the motion vector of the current block and/or the reference picture index.

Inter prediction may be performed based on various prediction modes. For example, in the case of a skip mode and a merge mode, the motion information of the current block may be equal to the motion information of the selected neighboring block. In the case of the skip mode, a residual signal may not be transmitted unlike the merge mode. In the case of a motion information prediction (MVP) mode, the motion vector of the selected neighboring block may be used as a motion vector predictor and a motion vector difference may be signaled. In this case, the motion vector of the current block may be derived using a sum of the motion vector predictor and the motion vector difference. In the present disclosure, the MVP mode may have the same meaning as advanced motion vector prediction (AMVP).

The motion information may include L0 motion information and/or L1 motion information according to the inter prediction type (L0 prediction, L1 prediction, Bi prediction, etc.). The motion vector in an L0 direction may be referred to as an L0 motion vector or MVL0, and the motion vector in an L1 direction may be referred to as an L1 motion vector or MVL1. Prediction based on the L0 motion vector may be referred to as L0 prediction, prediction based on the L1 motion vector may be referred to as L1 prediction, and prediction based both the L0 motion vector and the L1 motion vector may be referred to as Bi prediction. Here, the L0 motion vector may indicate a motion vector associated with a reference picture list L0 (L0) and the L1 motion vector may indicate a motion vector associated with a reference picture list L1 (L1). The reference picture list L0 may include pictures before the current picture in output order as reference pictures, and the reference picture list L1 may include pictures after the current picture in output order. The previous pictures may be referred to as forward (reference) pictures and the subsequent pictures may be referred to as reverse (reference) pictures. The reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 4:
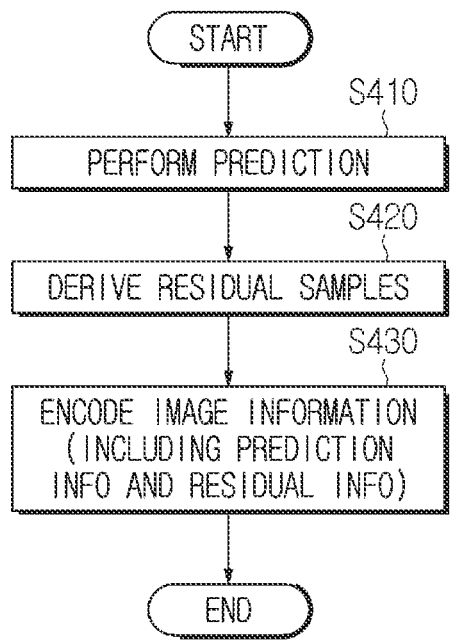
FIG. 4 is a schematic flowchart of a decoding process, to which an embodiment of the present disclosure is applicable.

FIG. 4 is a flowchart illustrating an inter prediction based video/image encoding method.

Figure 5:
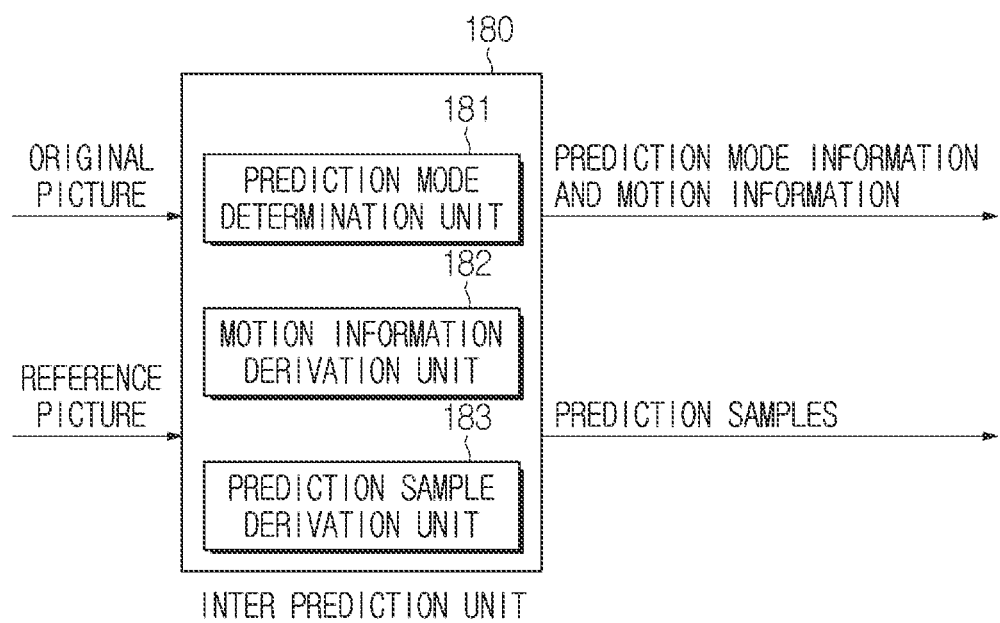
FIG. 5 is a schematic flowchart of an encoding process, to which an embodiment of the present disclosure is applicable.

FIG. 5 is a view illustrating the configuration of an inter predictor 180 according to the present disclosure.

The encoding method of FIG. 4 may be performed by the image encoding apparatus of FIG. 2. Specifically, step S410 may be performed by the inter predictor 180, and step S420 may be performed by the residual processor. Specifically, step S420 may be performed by the subtractor 115. Step S430 may be performed by the entropy encoder 190. The prediction information of step S430 may be derived by the inter predictor 180, and the residual information of step S430 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficient may be derived as quantized transform coefficients through the quantizer 130. Information on the quantized transform coefficients may be encoded by the entropy encoder 190 through a residual coding procedure.

Referring to FIGS. 4 and 5 together, the image encoding apparatus may perform inter prediction with respect to a current block (S410). The image encoding apparatus may derive an inter prediction mode and motion information of the current block and generate prediction samples of the current block. Here, inter prediction mode determination, motion information derivation and prediction sample generation procedures may be simultaneously performed or any one thereof may be performed before the other procedures. For example, as shown in FIG. 5, the inter predictor 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter predictor 180 of the image encoding apparatus may search for a block similar to the current block within a predetermined region (search region) of reference pictures through motion estimation, and derive a reference block with a difference from the current block which is equal to or less than a predetermined criterion or a minimum. Based on this, a reference picture index indicating a reference picture in which the reference block is located may be derived, and a motion vector may be derived based on a position difference between the reference block and the current block. The image encoding apparatus may determine a mode applied to the current block among various prediction modes. The image encoding apparatus may compare rate-distortion (RD) costs for the various prediction modes and determine an optimal prediction mode of the current block. However, the method of determining the prediction mode of the current block by the image encoding apparatus is not limited to the above example, and various methods may be used.

For example, when a skip mode or a merge mode is applied to the current block, the image encoding apparatus may derive merge candidates from neighboring blocks of the current block and construct a merge candidate list using the derived merge candidates. In addition, the image encoding apparatus may derive a reference block with a difference from the current block, which is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to an image decoding apparatus. The motion information of the current block may be derived using the motion information of the selected merge candidate.

As another example, when an MVP mode is applied to the current block, the image encoding apparatus may derive motion vector predictor (mvp) candidates from the neighboring blocks of the current block and construct an mvp candidate list using the derived mvp candidates. In addition, the image encoding apparatus may use the motion vector of the mvp candidate selected from among the mvp candidates included in the mvp candidate list as the mvp of the current block. In this case, for example, the motion vector indicating the reference block derived by the above-described motion estimation may be used as the motion vector of the current block, an mvp candidate with a motion vector having a smallest difference from the motion vector of the current block among the mvp candidates may be the selected mvp candidate. A motion vector difference (MVD) which is a difference obtained by subtracting the mvp from the motion vector of the current block may be derived. In this case, index information indicating the selected mvp candidate and information on the MVD may be signaled to the image decoding apparatus. In addition, when the MVP mode is applied, the value of the reference picture index may be constructed as reference picture index information and separately signaled to the image decoding apparatus.

The image encoding apparatus may derive residual samples based on the prediction samples (S420). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S430). The image encoding apparatus may output the encoded image information in the form of a bitstream. The prediction information may include prediction mode information (e.g., skip flag, merge flag or mode index, etc.) and motion information as information related to the prediction procedure. Of the prediction mode information, the skip flag indicates whether a skip mode is applied to the current block, and the merge flag indicates whether the merge mode is applied to the current block. Alternatively, the prediction mode information may indicate one of a plurality of prediction modes, like a mode index. When the skip flag and the merge flag are 0, it may be determined that the MVP mode is applied to the current block. The motion information may include candidate selection information (e.g., merge index, mvp flag or mvp index) which is information for deriving a motion vector. Of the candidate selection information, the merge index may be signaled when the merge mode is applied to the current block and may be information for selecting one of merge candidates included in a merge candidate list. Of the candidate selection information, the mvp flag or the mvp index may be signaled when the MVP mode is applied to the current block and may be information for selecting one of mvp candidates in an mvp candidate list. In addition, the motion information may include information on the above-described MVD and/or reference picture index information. In addition, the motion information may include information indicating whether L0 prediction, L1 prediction or Bi prediction is applied. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

Figure 6:
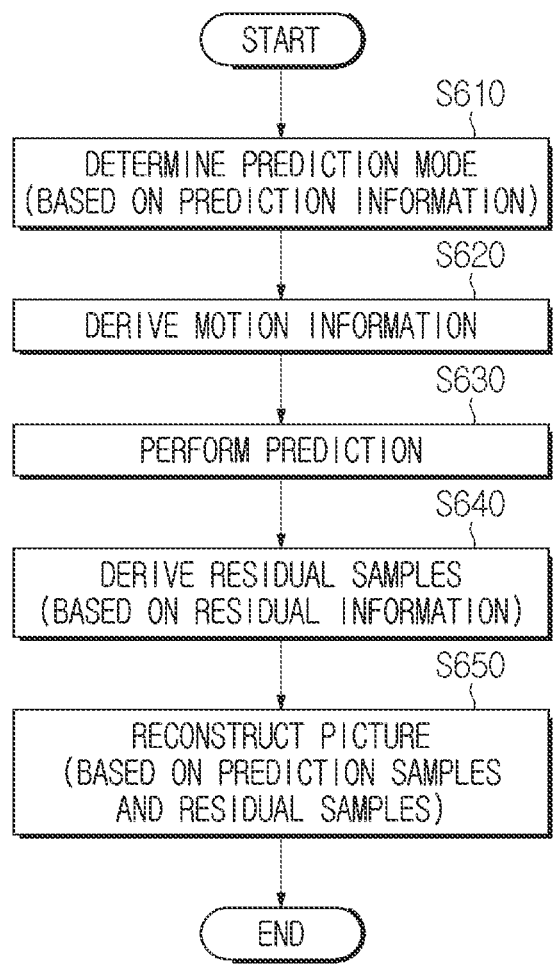
FIG. 6 is a flowchart illustrating an inter prediction based video/image decoding method.
Figure 7:
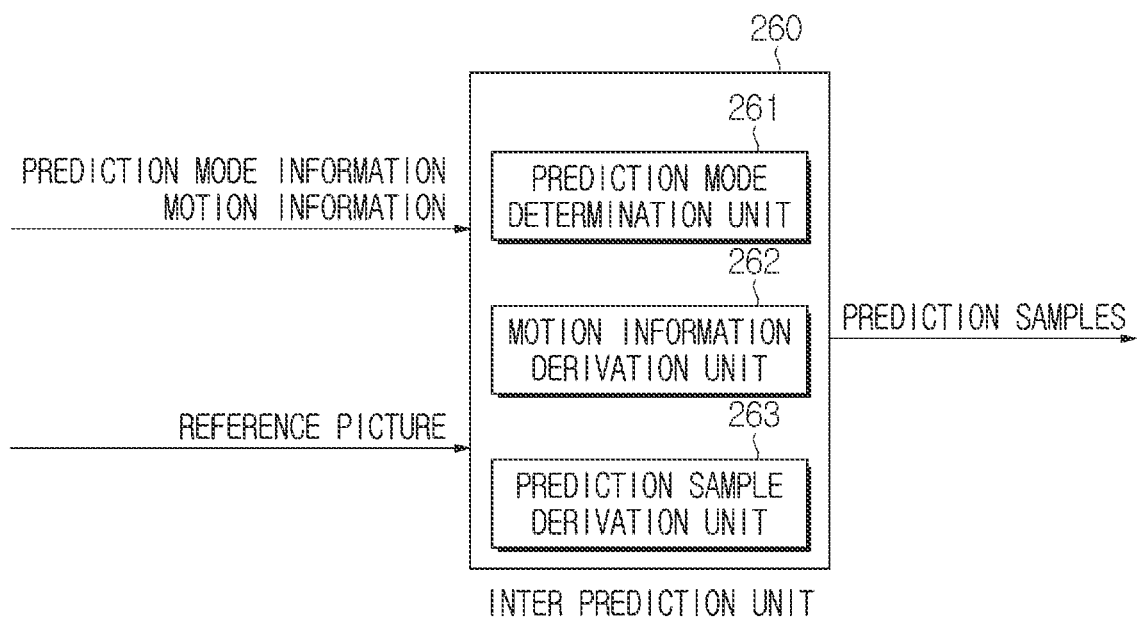
FIG. 7 is a view illustrating the configuration of an inter predictor 260 according to the present disclosure.

FIG. 6 is a flowchart illustrating an inter prediction based video/image decoding method, and FIG. 7 is a view illustrating the configuration of an inter predictor 260 according to the present disclosure.

The image decoding apparatus may perform operation corresponding to operation performed by the image encoding apparatus. The image decoding apparatus may perform prediction with respect to a current block based on received prediction information and derive prediction samples.

The decoding method of FIG. 6 may be performed by the image decoding apparatus of FIG. 3. Steps S610 to S630 may be performed by the inter predictor 260, and the prediction information of step S610 and the residual information of step S640 may be obtained from a bitstream by the entropy decoder 210. The residual processor of the image decoding apparatus may derive residual samples for a current block based on the residual information (S640). Specifically, the dequantizer 220 of the residual processor may perform dequantization to derive transform coefficients based on dequantized transform coefficients derived based on the residual information, and the inverse transformer 230 of the residual processor may perform inverse transform with respect to the transform coefficients to derive the residual samples for the current block. Step S650 may be performed by the adder 235 or the reconstructor.

Referring to FIGS. 6 and 7 together, the image decoding apparatus may determine the prediction mode of the current block based on the received prediction information (S610). The image decoding apparatus may determine which inter prediction mode is applied to the current block based on the prediction mode information in the prediction information.

For example, it may be determined whether the skip mode is applied to the current block based on the skip flag. In addition, it may be determined whether the merge mode or the MVP mode is applied to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S620). For example, the image decoding apparatus may construct a merge candidate list, which will be described below, and select one of merge candidates included in the merge candidate list, when the skip mode or the merge mode is applied to the current block. The selection may be performed based on the above-described candidate selection information (merge index). The motion information of the current block may be derived using the motion information of the selected merge candidate. For example, the motion information of the selected merge candidate may be used as the motion information of the current block.

As another example, the image decoding apparatus may construct an mvp candidate list and use the motion vector of an mvp candidate selected from among mvp candidates included in the mvp candidate list as an mvp of the current block, when the MVP mode is applied to the current block. The selection may be performed based on the above-described candidate selection information (mvp flag or mvp index). In this case, the MVD of the current block may be derived based on information on the MVD, and the motion vector of the current block may be derived based on mvp and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S630). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed with respect to all or some of the prediction samples of the current block.

For example, as shown in FIG. 7, the inter predictor 260 of the image decoding apparatus may include a prediction mode determination unit 261, a motion information derivation unit 262 and a prediction sample derivation unit 263. In the inter predictor 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S640). The image decoding apparatus may generate the reconstructed samples of the current block based on the prediction samples and the residual samples and generate a reconstructed picture based on this (S650). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating a prediction sample) based on the derived motion information. The inter prediction procedure may be performed by the image encoding apparatus and the image decoding apparatus, as described above.

Overview of Subpicture

Hereinafter, a subpicture according to the present disclosure will be described.

One picture may be partitioned in units of tiles, and each tile may be further partitioned in units of subpictures. Each subpicture may include one or more slices and construct a rectangular area within a picture.

Figure 8:
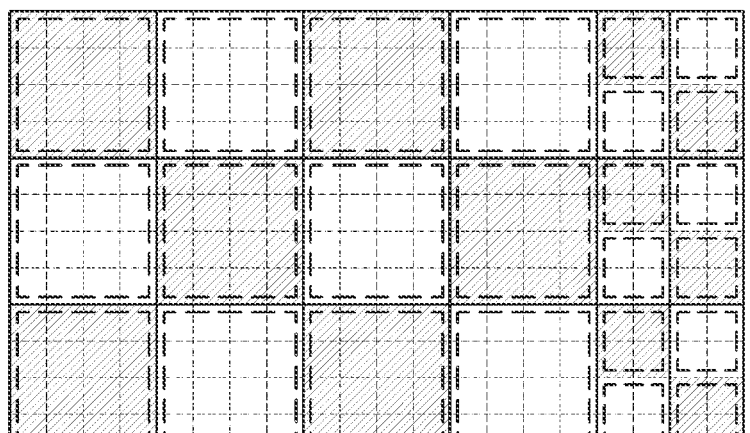
FIG. 8 is a view showing an example of a subpicture.

FIG. 8 is a view showing an example of a subpicture.

Referring to FIG. 8, one picture may be partitioned into 18 tiles, 12 tiles may be disposed on the left-hand side of the picture and each tile may include one subpicture/slice consisting of 16 CTUs. In addition, 6 tiles may be disposed on the right-hand side of the picture, and each tile may include two subpictures/slices consisting of four CTUs. As a result, the picture may be partitioned into 24 subpictures and each subpicture may include one slice.

Information on a subpicture (e.g., the number and size of subpictures, etc.) may be encoded/signaled through a higher level syntax, such as an SPS, a PPS and/or a slice header.

FIG. 9 is a view showing an example of an SPS including information on a subpicture.

Referring to FIG. 9, the SPS may include a syntax element subpic_info_present_flag specifying whether subpicture information is present for a coded layer video sequence (CLVS). For example, subpic_info_present_flag having a first value (e.g., 0) may specify that subpicture information is not present for the CLVS and only one subpicture is present in each picture of the CLVS, subpic_info_present_flag having a second value (e.g., 1) may specify that subpicture information is present for the CLVS and one or more than one subpicture is present in each picture of the CLVS. In an example, when picture spatial resolution may be changed within the CLVS referring to the SPS (e.g., res_change_in_clvs_allowed_flag=1), the value of subpic_info_present_flag shall be equal to a first value (e.g., 0). Meanwhile, w % ben a bitstream is the result of a sub-bitstream extraction process and contains only a subset of the subpictures of the input bitstream to the sub-bitstream extraction process, the value of subpic_info_present_flag shall be a second value (e.g., 1).

In addition, the SPS may include a syntax element sps_num_subpics_minus1 indicating the number of subpictures. For example, sps_num_subpics_minus1 plus 1 may specify the number of subpictures included in each picture in the CLVS. In an example, the value of sps_num_subpics_minus1 shall be in the range of 0 to Ceil(pic_width_max_in_luma_samples/CtbSizeY)*Ceil(pic_height_max_in_luma_samples/CtbSizeY), inclusive. Here, Ceil(x) may be a ceiling function for outputting a smallest integer value greater than or equal to x. In addition, pic_width_max_in_luma_samples may mean a maximum width of a luma sample unit of each picture, pic_height_max_in_luma_samples may mean a maximum height of a luma sample unit of each picture, and CtbSizeY may mean an array size of each luma component coding tree block (CTB) in both the width and height. Meanwhile, when sps_num_subpics_minus1 is not present, the value of sps_num_subpics_minus1 may be inferred to be equal to a first value (e.g., 0).

In addition, the SPS may include a syntax element sps_independent_subpics_flag specifying whether a subpicture boundaries are treated as picture boundaries. For example, sps_independent_subpics_flag having a second value (e.g., 1) may specify that all subpicture boundaries in the CLVS are treated as picture boundaries and there is no loop filtering across the subpicture boundaries. In contrast, sps_independent_subpics_flag having a first value (e.g., 0) may specify that the above-described constraint is not imposed. Meanwhile, when sps_independent_subpics_flag is not present, the value of sps_independent_subpics_flag may be inferred to be equal to a first value (e.g., 0).

In addition, the SPS may include syntax elements subpic_ctu_top_left_x[i], subpic_ctu_top_left_y[i], subpic_width_minus1[i] and subpic_height_minus1[i] specifying the position and size of a subpicture.

subpic_ctu_top_left_x[i] may specify the horizontal position of a top left CTU of an i-th subpicture in unit of CtbSizeY. In an example, the length of subpic_ctu_top_left_x[i] may be Ceil(Log 2((pic_width_max_in_luma_samples+CtbSizeY−1)>>Ctb Log 2SizeY)) bits. Meanwhile, when subpic_ctu_top_left_x[i] is not present, the value of subpic_ctu_top_left_x[i] may be inferred to be equal to a first value (e.g., 0).

subpic_ctu_top_left_y[i] may specify the vertical position of a top left CTU of an i-th subpicture in unit of CtbSizeY. In an example, the length of subpic_ctu_top_left_y[i] may be Ceil(Log 2((pic_height_max_in_luma_samples+CtbSizeY−1)>>Ctb Log 2SizeY)) bits. Meanwhile, when subpic_ctu_top_left_y[i] is not present, the value of subpic_ctu_top_left_y[i] may be inferred to be equal to a first value (e.g., 0).

subpic_width_minus1[i] plus 1 may specify the width of an i-th subpicture in unit of CtbSizeY. In an example, the length of subpic_width_minus1[i] may be Ceil(Log 2((pic_width_max_in_luma_samples+CtbSizeY−1)>>Ctb Log 2SizeY)) bits. Meanwhile, when subpic_width_minus1[i] is not present, the value of subpic_width_minus1[i] may be inferred to be equal to ((pic_width_max_in_luma_samples+CtbSizeY−1)>>Ctb Log 2SizeY)−subpic_ctu_top_left_x[i]−1.

subpic_height_minus1[i] plus 1 may specify the height of an i-th subpicture in unit of CtbSizeY. In an example, the length of subpic_height_minus1[i] may be Ceil(Log 2((pic_height_max_in_luma_samples+CtbSizeY−1)>>Ctb Log 2SizeY)) bits. Meanwhile, when subpic_height_minus1[i] is not present, the value of subpic_height_minus1[i] may be inferred to be equal to ((pic_height_max_in_luma_samples+CtbSizeY−1)>>Ctb Log 2SizeY)−subpic_ctu_top_left_y[i]−1.

In addition, the SPS may include subpic_treated_as_pic_flag[i] specifying whether a subpicture is treated as a picture. For example, subpic_treated_as_pic_flag[i] having a first value (e.g., 0) may specify that the i-th subpicture of each coded picture in the CLVS is not treated as a picture in the decoding process excluding in-loop filtering operations. In contrast, subpic_treated_as_pic_flag[i] having a second value (e.g., 1) may specify that the i-th subpicture of each coded picture in the CLVS is treated as a picture in the decoding process excluding in-loop filtering operations. When subpic_treated_as_pic_flag[i] is not present, the value of subpic_treated_as_pic_flag[i] may be inferred to be equal to the above-described sps_independent_subpics_flag. In an example, when subpic_treated_as_pic_flag[i] may be encoded/signaled only when the above-described sps_independent_subpics_flag has a first value (e.g., 0) (that is, when subpicture boundaries are not treated as picture boundaries).

Meanwhile, when subpic_treated_as_pic_flag[i] has a second value (e.g., 1), it is a requirement of bitstream conformance that all of the following conditions are true for each output layer and its reference layers in an output layer set (OLS) that includes the layer containing the i-th subpicture as an output layer.

(Condition 1) All pictures in the output layer and its reference layers shall have the same value of pic_width_in_luma_samples and the same value of pic_height_in_luma_samples.

(Condition 2) All the SPSs referred to by the output layer and its reference layers shall have the same value of sps_num_subpics_minus1, and shall have the same values of subpic_ctu_top_left_x[j], subpic_ctu_top_left_y[j], subpic_width_minus1[j], subpic_height_minus1[j] and loop_filter_across_subpic_enabled_flag[j]. Here, j is in the range of 0 to sps_num_subpics_minus1, inclusive.

In addition, the SPS may include a syntax element loop_filter_across_subpic_enabled_flag[i] specifying whether in-loop filtering operations are performed across the subpictures boundaries. For example, loop_filter_across_subpic_enabled_flag[i] having a first value (e.g., 0) may specify that in-loop filtering operations are not performed across the boundaries of the i-th subpicture in each coded picture in the CLVS, loop_filter_across_subpic_enabled_flag[i] having a second value (e.g., 1) may specify that in-loop filtering operations may be performed across the boundaries of the i-th subpicture in each coded picture in the CLVS. When loop_filter_across_subpic_enabled_flag[i] is not present, the value of loop_filter_across_subpic_enabled_flag[i] may be inferred to be equal to 1−sps_independent_subpics_flag. In an example, loop_filter_across_subpic_enabled_flag[i] may be coded/signaled only when the above-described sps_independent_subpics_flag has a first value (e.g., 0) (that is, when subpicture boundaries are not treated as picture boundaries). Meanwhile, it is a requirement of bitstream conformance that the shapes of the subpictures shall be such that each subpicture, when decoded, shall have its entire left boundary and entire top boundary consisting of picture boundaries or consisting of boundaries of previously decoded subpictures.

Figure 10:
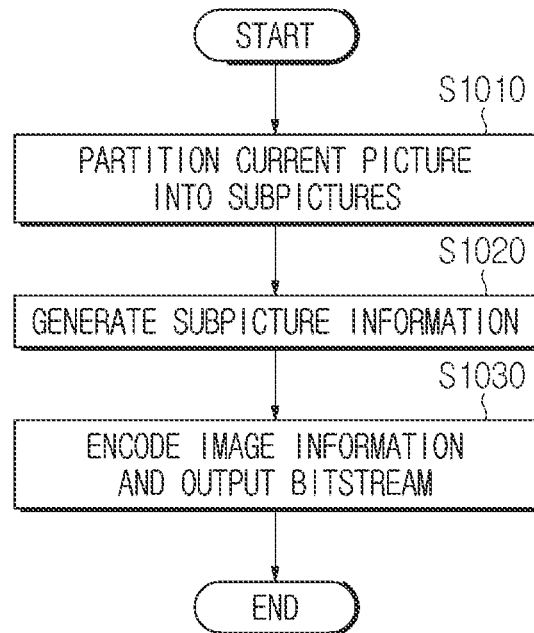
FIG. 10 is a view illustrating a method of encoding an image using a subpicture by an image encoding apparatus according to an embodiment of the present disclosure.

FIG. 10 is a view illustrating a method of encoding an image using a subpicture by an image encoding apparatus according to an embodiment of the present disclosure.

The image encoding apparatus may encode a current picture based on a subpicture structure. Alternatively, the image encoding apparatus may encode at least one subpicture constructing the current picture and output a (sub) bitstream including (coded) information of at least one (coded) subpicture.

Referring to FIG. 10, the image encoding apparatus may partition an input picture into a plurality of subpictures (S1010). In addition, the image encoding apparatus may generate information on a subpicture (S1020). Here, the information on the subpicture may include, for example, information on the area of the subpicture and/or a grid spacing for use in the subpicture. In addition, the information on the subpicture may include information indicating whether each subpicture is treated as a picture and/or information indicating whether in-loop filtering may be performed across each subpicture boundary.

The image encoding apparatus may encode at least one subpicture based on the information on the subpicture. For example, each subpicture may be independently coded based on the information on the subpicture. In addition, the image encoding apparatus may encode image information including the information on the subpicture and output a bitstream (S1030). Here, the bitstream for the subpicture may be referred to as a substream or a subbitstream.

Figure 11:
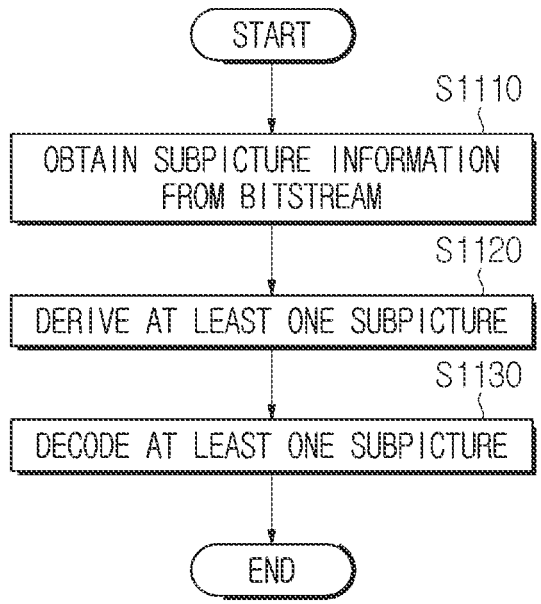
FIG. 11 is a view illustrating a method of decoding an image using a subpicture by an image decoding apparatus according to an embodiment of the present disclosure.

FIG. 11 is a view illustrating a method of decoding an image using a subpicture by an image decoding apparatus according to an embodiment of the present disclosure.

The image decoding apparatus may decode at least one subpicture included in a current picture using (coded) information of at least one (coded) subpicture obtained from a (sub)bitstream.

Referring to FIG. 11, the image decoding apparatus may obtain information on a subpicture from the bitstream (S1110). Here, the bitstream may include a substream or subbitstream for a subpicture. The information on the subpicture may constructed in a higher level syntax of the bitstream. In addition, the image decoding apparatus may derive at least one subpicture on the information on the subpicture (S1120).

The image decoding apparatus may decode at least one subpicture based on the information on the subpicture (S1130). For example, when a current subpicture including a current block is treated as a picture, the current subpicture may be independently decoded. In addition, when in-loop filtering may be performed across the boundary of the current subpicture, in-loop filtering (e.g., deblocking filtering) may be performed for the boundary of the current subpicture and the boundary of a neighboring subpicture adjacent to the above-described boundary. In addition, when the boundary of the current subpicture matches the picture boundary, in-loop filtering may not be performed across the boundary of the current subpicture. The image decoding apparatus may decode the subpicture based on a CABAC method, a prediction method, a residual processing method (transform and quantization), an in-loop filtering method, etc. In addition, the image decoding apparatus may output at least one decoded subpicture or output a current picture including at least one subpicture. The decoded subpicture may be output in the form of an output sub-picture set (OPS). For example, in relation to a 360-degree image or an omnidirectional image, when only a portion of the current picture is rendered, only some of all subpictures in the current picture may be decoded and all or some of the decoded subpictures may be rendered according to the viewport of a user.

Overview of Wraparound

When inter prediction is applied to a current block, the prediction block of the current block may be derived based on a reference block specified by the motion vector of the current block. In this case, when at least one reference sample in the reference block is out of the boundary of the reference picture, the sample value of the reference sample may be replaced by the sample value of a neighboring sample present at the outermost side or boundary of the reference picture. This may be referred to as padding, and the boundary of the reference picture may expand through padding.

Meanwhile, when the reference picture is obtained from a 360-degree image, there may be continuity between the left and right boundaries of the reference picture. Therefore, samples adjacent to the left boundary (or the right boundary) of the reference picture may have sample values and/or motion information equal/similar to those of samples adjacent to the right boundary (or the left boundary) of the picture. Based on such characteristics, at least one reference sample that is out of the reference picture in the reference block may be replaced by a neighboring sample in the reference picture corresponding to the reference sample. This may be referred to as (horizontal) wraparound motion compensation, and the motion vector of the current block may be adjusted to indicate the inside of the reference picture through the wraparound motion compensation.

Wraparound motion compensation means a coding tool designed to improve the visual quality of reconstructed image/video, for example, 360-degree image/video projected in the equi-rectangular projection (ERP) format. According to the existing motion compensation process, the motion vector of the current block refers to samples that are out of the boundary of the reference picture, the sample values of the out-of-bound samples may be derived by copying the sample values of the nearest neighboring samples on the boundaries through repetitive padding. However, since a 360-degree image/video is captured on a sphere and inherently has no image boundary, the reference samples that are out of the boundary of a reference picture in the projected domain (two-dimensional domain) may always be obtained from neighboring samples adjacent to the reference samples in the spherical domain (three-dimensional domain). Accordingly, repetitive padding is not suitable for a 360-degree image/video, and could cause visual artefacts called "seam artefacts" in a reconstructed viewport image/video.

When a general projection format is applied, it may be difficult to obtain the neighboring samples for wraparound motion compensation in the spherical domain, because it involves 2D-to-3D and 3D-to-2D coordinate conversion, as well as sample interpolation for fractional sample positions. However, when the ERP projection format is applied, spherical neighboring samples that are out of the left boundary (or the right boundary) of the reference picture may be relatively easily obtained from samples inside the right boundary (or the left boundary) of the reference picture. Given the wide usage of the ERP projection format, and the relative ease of implementation, the horizontal wraparound motion compensation may be more effective for a 360-degree image/video coded in the ERP projection format.

Figure 12:
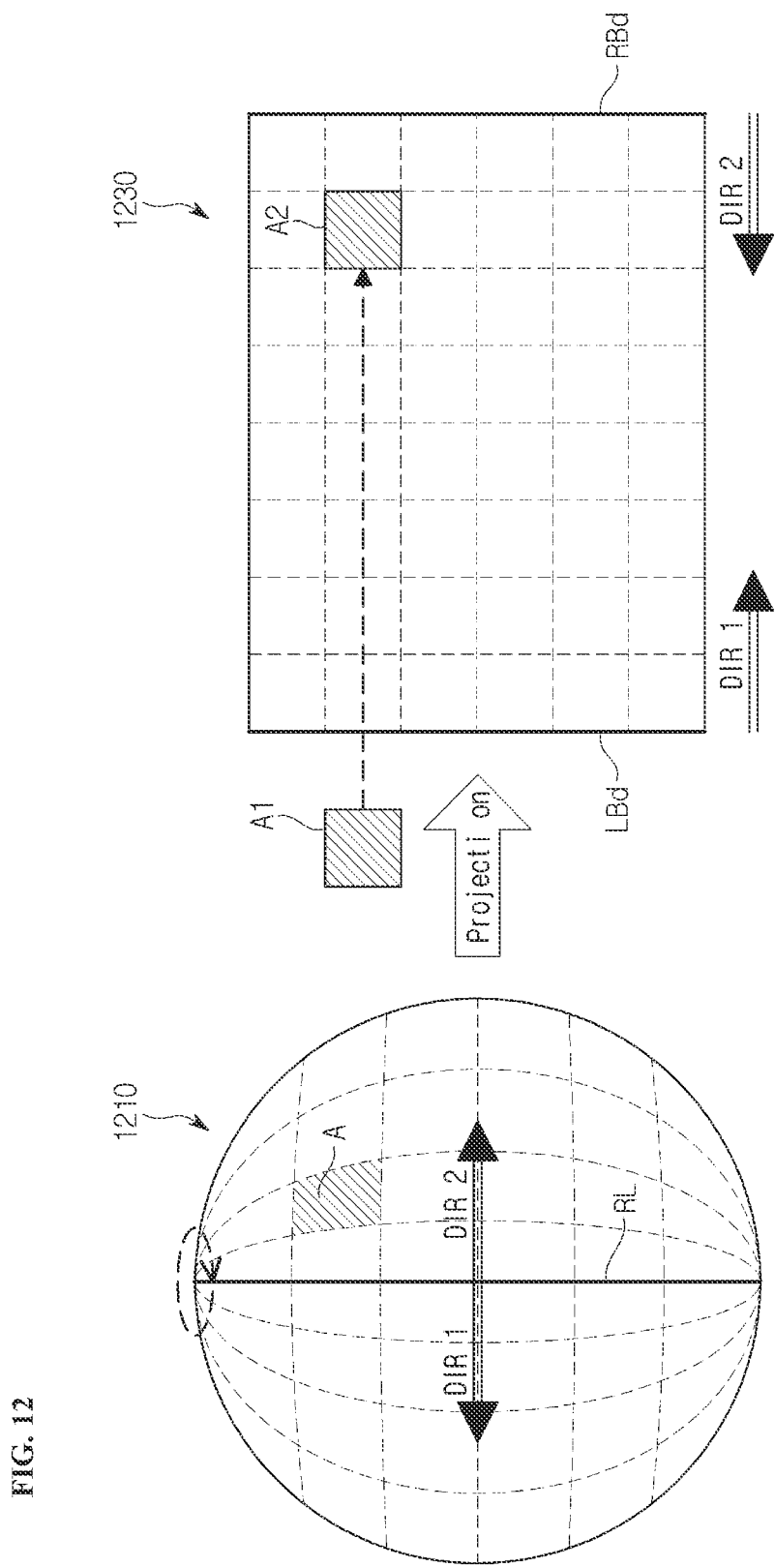
FIG. 12 is a view showing an example of a 360-degree image converted into a two-dimensional picture.

FIG. 12 is a view showing an example of a 360-degree image converted into a two-dimensional picture.

Referring to FIG. 12, a 360-degree image 1210 may be converted into a two-dimensional picture 1230 through a projection process. The two-dimensional picture 1230 may have various projection formats such as an equi-rectangular projection (ERP) format or a padded ERP (PERP) according to the projection method applied to the 360-degree image 1210.

The 360-degree image 1210 does not have an image boundary due to the characteristics of an image obtained in all directions. However, the two-dimensional picture 1230 obtained from the 360-degree image 1210 has an image boundary due to a projection process. In this case, the left boundary LBd and right boundary RBd of the two-dimensional picture 1230 constructs one line RL within the 360-degree image 1210 and may be in contact with each other. Accordingly, a degree of similarity between samples adjacent to the left boundary LBd and the right boundary RBd within the two-dimensional picture 1230 may be relatively high.

Meanwhile, a predetermined area in the 360-degree image 1210 may correspond to an inner area or outer area of the two-dimensional picture 1230 according to a reference image boundary. For example, based on the left boundary LBd of the two-dimensional picture 1230, an area A in the 360-degree image 1210 may correspond to an area A1 outside the two-dimensional picture 1230. In contrast, based on the right boundary RBd of the two-dimensional picture 1230, an area A in the 360-degree image 1210 may correspond to an area A2 inside the two-dimensional picture 1230. Areas A1 and A2 correspond to the same area A based on the 360-degree image 1210 and thus have the same/similar sample attributes.

Based on such characteristics, external samples that are out of the left boundary LBd of the two-dimensional picture 1230 may be replaced by internal samples of the two-dimensional picture 1230 at a position separated by a predetermined distance in a first direction DIR 1 through wraparound motion compensation. For example, external samples of the two-dimensional picture 1230 included in the area A1 may be replaced by internal samples of the two-dimensional picture 1230 included in the area A2. Similarly, external samples that are out of the right boundary RBd of the two-dimensional picture 1230 may be replaced by internal samples of the two-dimensional picture 1230 at a position separated by a predetermined distance in a second direction DIR 2 through wraparound motion compensation.

Figure 13:
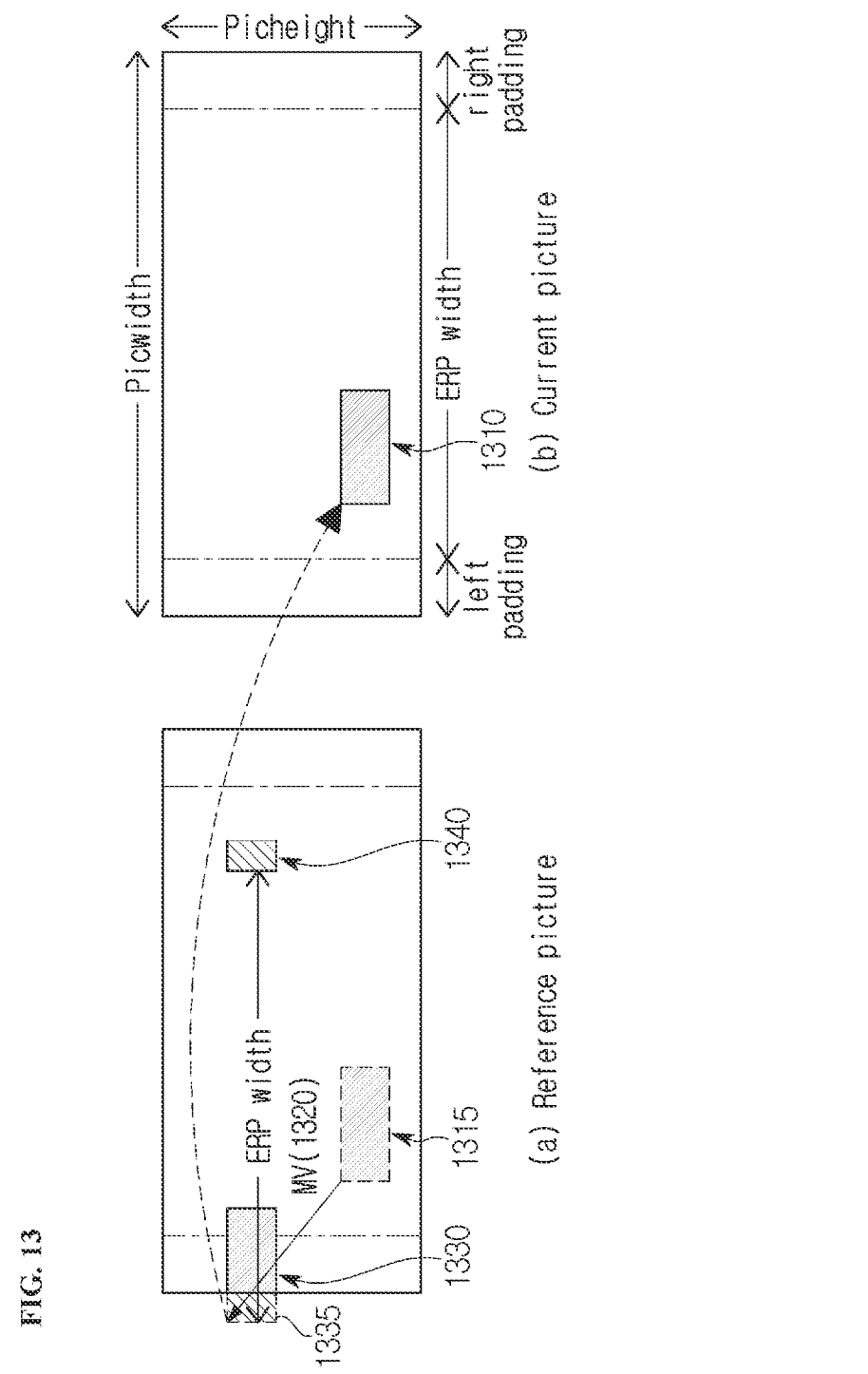
FIG. 13 is a view showing an example of a horizontal wraparound motion compensation process.

FIG. 13 is a view showing an example of a horizontal wraparound motion compensation process.

Referring to FIG. 13, when inter prediction is applied to the current block 1310, a prediction block of the current block 1310 may be derived based on a reference block 1330.

The reference block 1330 may be specified by the motion vector 1320 of the current block 1310. In an example, the motion vector 1320 may indicate a top left position of the reference block 1330 with respect to the top left position of the same position block 1315 present at the same position as the current block 1310 in the reference picture.

As shown in FIG. 13, the reference block 1330 may include a first area 1335 that is out of the left boundary of the reference picture. The first area 1335 cannot be used for inter prediction of the current block 1310 and thus may be replaced by a second area 1340 in the reference picture through wraparound motion compensation. The second area 1340 may correspond to the same area along with the first area 1335 in the spherical domain (three-dimensional domain), and the position of the second area 1340 may be specified by adding a wraparound offset to a predetermined position (e.g., a top left position) of the first area 1335.

The wraparound offset may be set to an ERP width before padding of the current picture. Here, the ERP width may mean the width of an original picture (that is, an ERP picture) of an ERP format obtained from the 360-degree image. A horizontal padding process may be performed with respect to the left boundary and right boundary of the ERP picture. Therefore, the width PicWidth of the current picture may be determined to be a value obtained by adding an ERP width, left padding for the left boundary of the ERP picture and right padding for the right boundary of the ERP picture. Meanwhile, the wraparound offset may be coded/signaled using a predetermined syntax element (e.g., pps_ref_wraparound_offset) in a higher level syntax. The syntax element is not affected by padding for the left and right boundaries of the ERP picture and, as a result, asymmetric padding for the original picture may be supported. That is, left padding for the left boundary and right padding for the right boundary of the ERP picture may be different from each other.

The information (e.g., activation, wraparound offset, etc.) on wraparound motion compensation described above may be coded/signaled through a higher level syntax such as an SPS and/or a PPS.

FIG. 14a is a view illustrating an example of an SPS including information on wraparound motion compensation.

Referring to FIG. 14a, the SPS may include a syntax element sps_ref_wraparound_enabled_flag specifying whether wraparound motion compensation is applied at a sequence level. For example, sps_ref_wraparound_enabled_flag having a first value (e.g., 0) may specify that wraparound motion compensation is not applied to a current video sequence including a current block. In contrast, sps- _ref_wraparound_enabled_flag having a second value (e.g., 1) may specify that wraparound motion compensation is applied to a current video sequence including a current block. In an example, wraparound motion compensation for a current video sequence is applicable only when a picture width (e.g., pic_width_in_luma_samples) and a CTB width CtbSizeY satisfy the following condition.

(Condition) (CtbSizeY/Min CbSizeY+1)≥
(pic_width_in_luma_samples/Min CbSizeY−1)

When the above condition is not satisfied, for example, when the value of (CtbSizeY/MinCbSizeY+1) is greater than the value of (pic_width_in_luma_samples/MinCbSizeY−1), sps_ref_wraparound_enabled_flag shall be equal to a first value (e.g., 0). Here, CtbSizeY may mean the width or height of a luma component CTB, and MinCbSizeY may mean a minimum width or height of a luma component coding block (CB). In addition, pic_width_max_in_luma_samples may mean a maximum width of a luma sample unit of each picture.

FIG. 14b is a view illustrating an example of a PPS including information on wraparound motion compensation.

Referring to FIG. 14b, the PPS may include a syntax element pps_ref_wraparound_enabled_flag specifying whether wraparound motion information is applied at a picture level.

Referring to FIG. 14b, the PPS may include a syntax element pps_ref_wraparound_enabled_flag specifying whether wraparound motion information is applied at a sequence level. For example, pps_ref_wraparound_enabled_flag having a first value (e.g., 0) may specify that wraparound motion compensation is not applied to a current picture including a current block. In contrast, pps_ref_wraparound_enabled_flag having a second value (e.g., 1) may specify that wraparound motion compensation is applied to a current picture including a current block. In an example, wraparound motion compensation for the current picture is applicable only when a picture width (e.g., pic_width_in_luma_samples) is greater than a CTB width CtbSizeY. For example, when the value of (CtbSizeY/MinCbSizeY+1) is greater than the value of (pic_width_in_luma_samples/MinCbSizeY−1), pps_ref_wraparound_enabled_flag shall be equal to a first value (e.g., 0). In another example, when sps_ref_wraparoud_enabled_flag has a first value (e.g., 0), the value of pps_ref_wraparound_enabled_flag shall be equal to a first value (e.g., 0).

In addition, the PPS may include a syntax element pps_ref_wraparound_offset specifying an offset of wraparound motion compensation. For example, a pps_ref_wraparound_offset plus ((CtbSizeY/MinCbSizeY)+2) may specify a wraparound offset for computing the wraparound position in units of luma samples. The value of pps_ref_wraparound_offset may be in the range of 0 to ((pic_width_in_luma_samples/MinCbSizeY)−(CtbSizeY/MinCbSizeY)−2), inclusive. Meanwhile, a variable PpsRefWraparoundOffset may be set equal to (pps_ref_wraparound_offset+(CtbSizeY/MinCbSizeY)+2). The variable PpsRefWraparoundOffset may be used for a process of clipping reference samples that are out of the boundary of the reference picture.

Meanwhile, when a current picture is partitioned into a plurality of subpictures, wraparound motion compensation may be performed based on the attributes of each subpicture.

Figure 15:
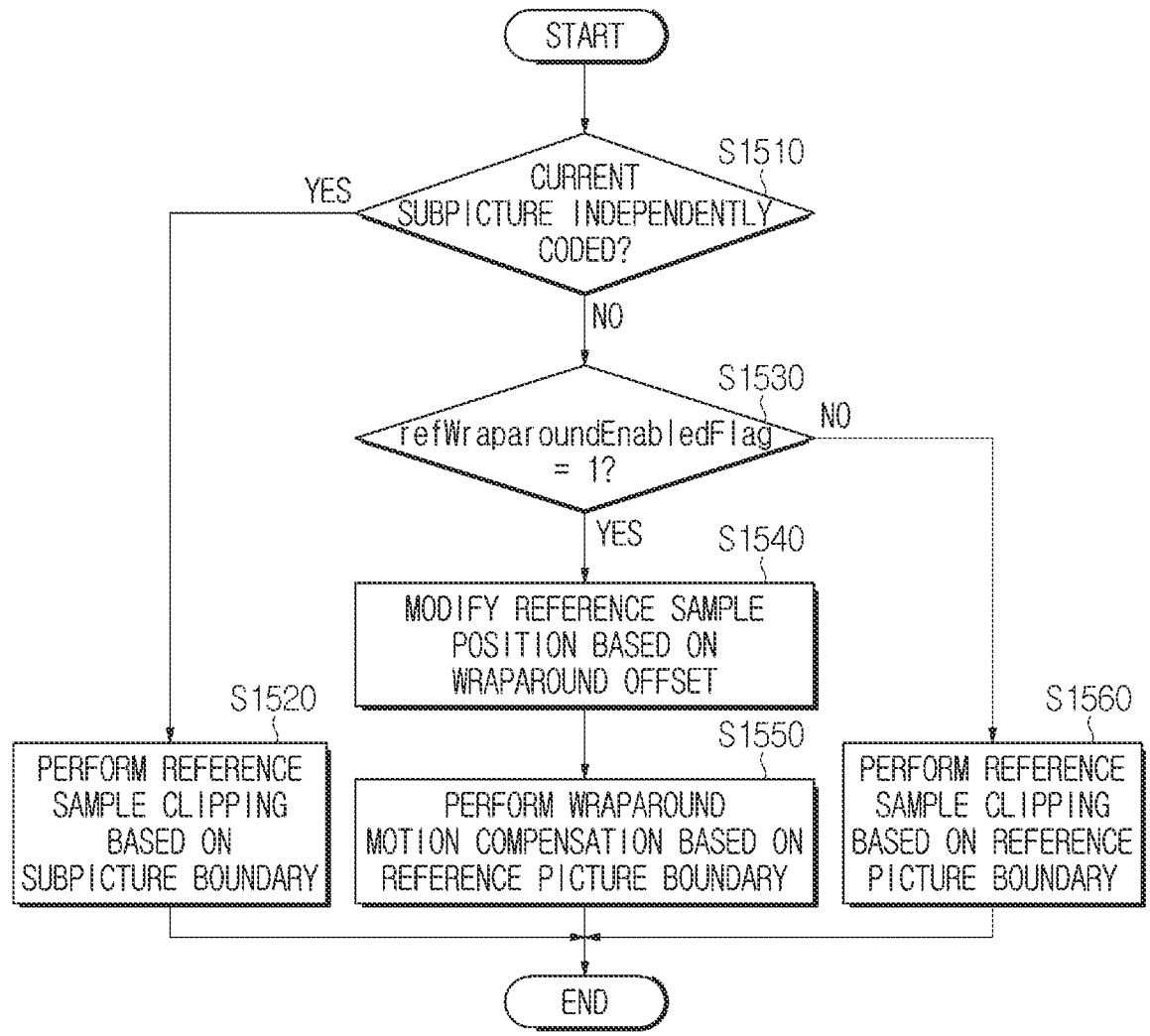
FIG. 15 is a flowchart illustrating a method of, by an image decoding apparatus, performing wraparound motion compensation based on subpicture attributes.

FIG. 15 is a flowchart illustrating a method of, by an image decoding apparatus, performing wraparound motion compensation based on subpicture attributes.

Referring to FIG. 15, the image decoding apparatus may determine whether a current picture is independently coded (S1510).

When the current subpicture is independently coded ("YES" of S1510), the image decoding apparatus may clip the position of a reference sample based on a subpicture boundary for motion compensation for the current block (S1520). The above operation may be, for example, performed using any one of a luma sample bilinear interpolation process, a luma sample interpolation process, a luma integer sample fetching process or a chroma sample interpolation process.

When the current subpicture is not independently coded ("NO" of S1510), the image decoding apparatus may determine whether wraparound motion compensation is enabled for the current block (S1530).

Whether wraparound motion compensation is enabled for the current block may be determined based on a predetermined variable (e.g., refWraparoundEnabledFlag). For example, when refWraparoundEnabledFlag has a first value (e.g., 0), wraparound motion compensation may not be enabled for the current block. In contrast, when refWraparoundEnabledFlag has a second value (e.g., 1), wraparound motion compensation may be enabled for the current block. In an example, the value of refWraparoundEnabledFlag may be derived based on a predetermined flag (e.g., pps_ref_wraparound_enabled_flag) obtained from a higher level syntax, for example, a picture parameter set.

When wraparound motion compensation is enabled for the current block ("YES" of S1530), the image decoding apparatus may modify the position of the reference sample using a wraparound offset (S1540). For example, the image decoding apparatus may modify the position of the reference sample, by shifting the x-coordinate of the reference sample by a wraparound offset (e.g., PpsRefWraparoundOffset*MinCbSizeY) in a positive or negative direction. In addition, the image decoding apparatus may clip the modified reference sample position based on the boundary of the reference picture for motion compensation for the current block (S1550).

In contrast, when wraparound motion compensation is not enabled for the current block ("NO" of S1530), the image decoding apparatus may clip the position of the reference sample based on the boundary of the reference picture for motion compensation for the current block (S1560).

Meanwhile, the above-described clipping operation may be performed using a luma sample bilinear interpolation process. A detailed example thereof is shown in Table 1 below.

TABLE 1

| Luma sample bilinear interpolation process |
| --- |
| The luma locations in full-sample units ( xInti, yInti ) are derived as follows for i = 0 . . . 1:<br>(1) Process 1<br>  If subpic_treated_as_pic_flag[ CurrSubpicIdx ] is equal to 1, the following applies:<br>    1) xInti = Clip3( SubpicLeftBoundaryPos, SubpicRightBoundaryPos, xInt$_L$ + i ) . . .    (A110)<br>    2) yInti = Clip3( SubpicTopBoundaryPos, SubpicBotBoundaryPos, yInt$_L$ + i ) . . .    (A120) |

TABLE 1-continued

| Luma sample bilinear interpolation process |
| --- |
| (2) Process 2 |
|   Otherwise (subpic_treated_as_pic_flag[ CurrSubpicIdx ] is equal to 0), the following applies: |
|     1) xInti = Clip3( 0, picW − 1, refWraparoundEnabledFlag ? ClipH( ( PpsRefWraparoundOffset ) |
|         * MinCbSizeY, picW, ( xInt$_L$ + i )) : xInt$_L$ + i ) . . .    (A130) |
|     2) yInti = Clip3(0, picH − 1, yInt$_L$ + i ) . . .    (A140) |

Referring to Table 1, the luma position (xInti, yInti) of the reference sample in an integer sample unit may be adjusted within a reference picture boundary or a subpicture boundary using a predetermined clipping function (Clip3, ClipH). Here, Clip3(x, y, z) means a function which outputs x when z is less than x, outputs y when z is greater than y, and, otherwise, outputs z. In addition, ClipH(x, y, z) means a function which outputs z+x when z is less than 0, outputs z−x when z is greater than y−1, and, otherwise, outputs z.

When a current subpicture is independently coded, Process 1 may be performed. Specifically, clipping operation based on the subpicture boundary may be performed for the x-coordinate and y-coordinate of the reference sample (A110 and A120). In Process 1, SubpicLeftBoundaryPos may indicate a subpicture left boundary, SubpicRightBoundaryPos may indicate a subpicture right boundary, SubpicTopBoundaryPos may indicate a subpicture top boundary, SubpicBotBoundaryPos may indicate a subpicture bottom boundary.

When the current subpicture is not independently coded, Process 2 may be performed. Specifically, for the x-coordinate of the reference sample, a wraparound offset (e.g., PpsRefWraparoundOffset) may selectively apply depending on whether wraparound motion compensation is enabled for the current block, and clipping operation based on a reference picture boundary may be performed for the selectively applied x-coordinate (A130). In contrast, for the y-coordinate of the reference sample, clipping operation based on a reference picture boundary may be performed regardless of whether wraparound motion compensation is enabled (A140). In Process 2, picW may indicate a reference picture width and picH may indicate a reference picture height.

Alternatively, the above-described clipping operation may be performed using a luma sample interpolation filtering process. A detailed example thereof is shown in Table 2 below.

TABLE 2

| Luma sample interpolation filtering process |
| --- |
| The luma locations in full-sample units ( xInti, yInti ) are derived as follows for i = 0 . . . 1: |
| (1) Process 1 |
|   If subpic_treated_as_pic_flag[ CurrSubpicIdx ] is equal to 1, the following applies: |
|     1) xInti = Clip3( SubpicLeftBoundaryPos, SubpicRightBoundaryPos, xInti ) . . .    (A210) |
|     2) yInti = Clip3( SubpicTopBoundaryPos, SubpicBotBoundaryPos, yInti ) . . .    (A220) |
| (2) Process 2 |
|   Otherwise (subpic_treated_as_pic_flag[ CurrSubpicIdx ] is equal to 0), the following applies: |
|     1) xInti = Clip3( 0, picW − 1, refWraparoundEnabledFlag ? |
|       ClipH( ( PpsRefWraparoundOffset ) * MinCbSizeY, picW, xInti ) : xInti ) . . .    (A230) |
|     2) yInti = Clip3( 0, picH − 1, yInti ) . . .    (A240) |

Referring to Table 2, the luma position (xInti, yInti) of the reference sample in the integer sample unit may be adjusted within a reference picture boundary or a subpicture boundary using a predetermined clipping function (Clip3, ClipH). A repeated description of Table 1 will be omitted.

Process 1 or 2 may be selectively performed depending on whether a current subpicture is independently coded. In addition, wraparound motion compensation may be performed only with respect to the x-coordinate of the reference sample (A230) when the current subpicture is not independently coded (Process 2).

Alternatively, the above-described clipping operation may be performed using a luma integer sample fetching procedure. A detailed example thereof is shop in Table 3 below.

TABLE 3

| Luma integer sample fetching process |
|---|
| The luma locations in foil-sample units ( xInt, yInt) are derived as follows: |
| (l) Process 1 |
|   If subpic_treated_as_pic_flag[ CurrSubpicIdx ] is equal to 1, the following applies: |
|     1) xInt = Clip3( SubpicLeftBoundaryPos, SubpicRightBoundaryPos, xInt$_L$ ) . . .    (A310) |
|     2) yInt = Clip3( SubpicTopBoundaryPos, SubpicBotBoundaryPos, yInt$_L$ ) . . .    (A320) |
| (2) Process 2 |
|   Otherwise, the following applies: |
|     1) xInt = Clip3( 0, picW − 1, refWraparoundEnabledFlag ? ClipH( ( PpsRefWraparoundOffset ) |
|       * MinCbSizeY, picW, xInt$_L$ ) : xInt$_L$ ) . . .    (A330) |
|     2) yInt = Clip3( 0, picH − 1, yInt$_L$ ) . . .    (A340) |

Referring to Table 3, the luma position (xInt, yInt) of the reference sample in the integer sample unit may be adjusted within a reference picture boundary or a subpicture boundary using a predetermined clipping function (Clip3, ClipH). A repeated description of Table 1 will be omitted.

Process 1 or 2 may be selectively performed depending on whether a current subpicture is independently coded. In addition, wraparound motion compensation may be performed only with respect to the x-coordinate of the reference sample (A330) when the current subpicture is not independently coded (Process 2).

In addition, the above-described clipping operation may be performed using a chroma sample interpolation process. A detailed example thereof is shown in Table 4 below.

TABLE 4

| Chroma sample interpolation process |
|---|
| The variable xOffset is set equal to ( PpsRefWraparoundOffset ) * MinCbSizeY )/SubWidthC. |
| The luma locations in full-sample units ( xInt, yInt ) are derived as follows: |
| (1) Process 1 |
|   If subpic_treated_as_pic_flag[ CurrSubpicIdx ] is equal to 1, the following applies: |
|     1) xInti = Clip3( SubpicLeftBoundaryPos/SubWidthC, SubpicRightBoundaryPos/SubWidthC, |
|       xInti ) . . .    (A410) |
|     2) yInt = Clip3( SubpicTopBoundaryPos/SubWidthC, SubpicBotBoundaryPos/SubWidthC, |
|       yIntL ) . . .    (A420) |
| (2) Process 2 |
|   Otherwise, the following applies; |
|     1) xInt = Clip3( 0, picW − 1, refWraparoundEnabledFlag ? ClipH( ( PpsRefWraparoundOffset ) |
|       * MinCbSizeY, picW, xIntL ) : xIntL ) . . .    (A430) |
|     2) yInt = Clip3( 0, picH − 1, yIntL ) . . .    (A440) |

Referring to Table 4, the luma position (xInt, yInt) of the reference sample in the integer sample unit may be adjusted within a reference picture boundary or a subpicture boundary using a predetermined clipping function (Clip3, ClipH). In this case, the reference picture boundary or the subpicture boundary may be determined based on a chroma sample unlike the method described above with reference to Tables 1 to 3. For example, SubWidthC and SubHeightC may indicate a width ratio and a height ratio between a luma sample and a chroma sample. In addition, based on the chroma sample, a subpicture left boundary may be determined to be (SubpicLeftBoundaryPos/SubWidthC), a subpicture right boundary may be determined to be (SubpicRightBoundaryPos/SubWidthC), a subpicture top boundary may be determined to be (SubpicTopBoundaryPos/SubWidthC) and a subpicture bottom boundary may be determined to be (SubpicBotBoundaryPos/SubWidthC).

Process 1 or 2 may be selectively performed depending on whether a current subpicture is independently coded. In addition, wraparound motion compensation may be performed only with respect to the x-coordinate of the reference sample (A430) when the current subpicture is not independently coded (Process 2).

Meanwhile, the method of FIG. 15 may be also performed by the image encoding apparatus, which is apparent to those skilled in the art.

According to the method of FIG. 15, wraparound motion compensation for the current block may be performed only when a current subpicture is not independently coded. As a result, a wraparound related coding tool cannot be used along with various subpicture related coding tools based on independent coding of a subpicture. This may deteriorate encoding/decoding performance with respect to pictures having continuity between boundaries, such as ERP pictures or PERP pictures.

In order to solve such a problem, according to the embodiments of the present disclosure, even when the current subpicture is independently coded, wraparound motion compensation may be performed according to a predetermined condition. Hereinafter, embodiments of the present disclosure will be described in detail.

According to an embodiment of the present disclosure, when all independently coded subpictures in a current video sequence have a width equal to a picture width, wraparound motion compensation may be enabled for all subpictures in the current video sequence.

Figure 16:
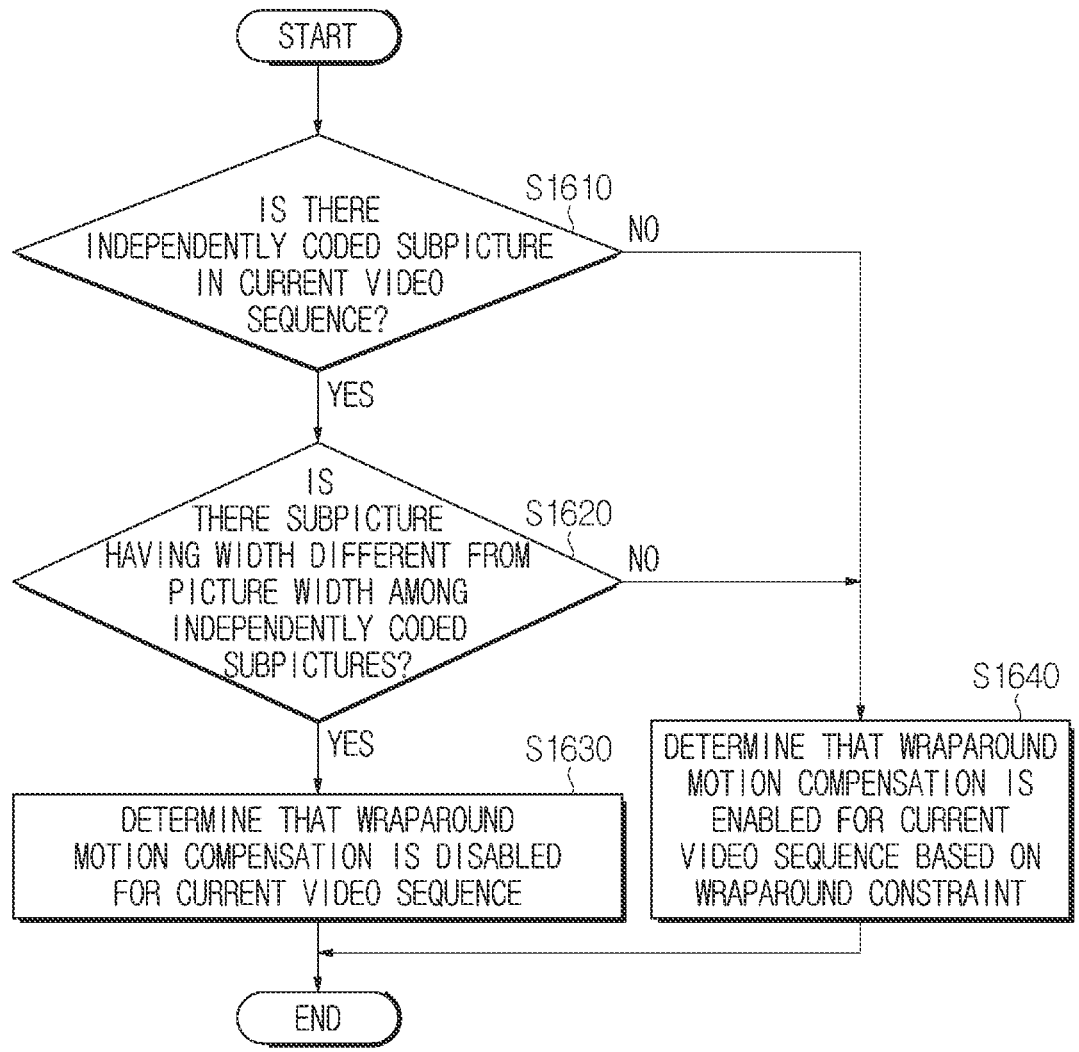
FIG. 16 is a flowchart illustrating a method of determining whether wraparound motion compensation is enabled by an image encoding apparatus according to an embodiment of the present disclosure.

FIG. 16 is a flowchart illustrating a method of determining whether wraparound motion compensation is enabled by an image encoding apparatus according to an embodiment of the present disclosure.

Referring to FIG. 16, the image encoding apparatus may determine whether there are one or more independently coded subpictures in a current video sequence (S1610).

Upon determining that there are not one or more independently coded subpictures in the current video sequence ("NO" of S1610), the image encoding apparatus may determine whether wraparound motion compensation is enabled for the current video sequence based on a predetermined wraparound constraint (S1640). In this case, the image encoding apparatus may encode flag information (e.g., sps_wraparound_enabled_flag) specifying whether wraparound motion compensation is enabled for the current video sequence as a first value (e.g., 0) or a second value (e.g., 1), based on the determination.

As an example of the wraparound constraint, when wraparound motion compensation is constrained for one or more output layer sets (OLSs) specified by a video parameter set (VPS), wraparound motion compensation shall not be enabled for the current video sequence. As another example of the wraparound constraint, when all subpictures in the current video sequence have discontinuous subpicture boundaries, wraparound motion compensation shall not be enabled for the current video sequence.

In contrast, upon determining that there are one or more subpictures coded independently in the current video sequence ("YES" of S1610), the image encoding apparatus may determine whether a subpicture having a width different from a picture width is present among the independently coded subpictures (S1620).

In one embodiment, the picture width may be derived based on a maximum width of a picture in the current video sequence as shown in Equation 1.

$$(\text{pic\_width\_max\_in\_luma\_samples}+ CtbSizeY-1)>>Ctb\log 2SizeY \quad \text{[Equation 1]}$$

where, pic_width_max_in_luma_samples may indicate a maximum picture width in units of luma samples, CtbSizeY may indicate a width of a coding tree block (CTB) in a picture in units of luma samples, and Ctb Log 2SizeY may indicate a log scale value of CtbSizeY.

Upon determining that at least one of independently coded subpictures has a width different from a picture width ("YES" of S1620), the image encoding apparatus may determine that wraparound motion compensation is disabled for the current video sequence (S1630). In this case, the image encoding apparatus may encode sps_ref_wraparound_enabled_flag as a first value (e.g., 0).

In contrast, upon determining that at least one of independently coded subpictures has the same width as a picture width ("NO" of S1620), the image encoding apparatus may determine whether wraparound motion compensation is enabled for the current video sequence based on the above-described wraparound constraint (S1640). In this case, the image encoding apparatus may encode sps_ref_wraparound_enabled_flag as a first value (e.g., 0) or a second value (e.g., 1) based on the determination.

Although steps S1610 and S1620 are shown as being sequentially performed in FIG. 16, this is only an example and the embodiments of the present disclosure are not limited thereto. For example, step S1620 may be performed simultaneously with step S1610 or before step S1610.

Meanwhile, sps_ref_wraparound_enabled_flag encoded by the image encoding apparatus may be stored in a bitstream and signaled to an image decoding apparatus. In this case, the image decoding apparatus may determine whether wraparound motion information is enable for the current video sequence based on sps_ref_wraparound_enabled_flag obtained from the bitstream.

For example, when sps_ref_wraparound_enabled_flag has a first value (e.g., 0), the image decoding apparatus may determine that wraparound motion compensation is disabled for the current video sequence and may not perform wraparound motion compensation with respect to the current block. In this case, the reference sample position of the current block may be clipped based on a reference picture boundary or a subpicture boundary, and motion compensation may be performed using a reference sample at a clipped position.

That is, the image decoding apparatus may perform correct motion compensation according to the present disclosure, without separately determining whether there are one or more subpictures coded independently and having a width different from a picture width in the current video sequence. However, operation of the image decoding apparatus is not limited thereto and, for example, the image decoding apparatus may determine whether there are one or more subpictures coded independently and having a width different from a picture width in the current video sequence and then perform motion compensation based on the result of determination. More specifically, the image decoding apparatus may determine whether there are one or more subpictures coded independently and having a width different from a picture width in the current video sequence and may not perform wraparound motion compensation by regarding sps_ref_wraparound_enabled_flag as a first value (e.g., 0) when there are such subpictures.

In contrast, when sps_ref_wraparound_enabled_flag has a second value (e.g., 1), the image decoding apparatus may determine that wraparound motion compensation is enabled for the current video sequence. In this case, the image decoding apparatus may additionally obtain a wraparound flag (e.g., pps_ref_wraparound_enabled_flag) specifying whether wraparound motion compensation is enabled for the current picture from a bitstream and determine whether wraparound motion compensation is performed with respect to the current block based on the obtained wraparound flag information.

For example, when pps_ref_wraparound_enabled_flag has a first value (e.g., 0), the image decoding apparatus may not perform wraparound motion compensation with respect to the current block. In this case, the reference sample position of the current block may be clipped based on a reference picture boundary or a subpicture boundary and motion compensation may be performed using a reference sample at the clipped position. In contrast, when pps_ref_wraparound_enabled_flag has a second value (e.g., 1), the image decoding apparatus may perform wraparound motion compensation with respect to the current block.

As described above, when all independently coded subpictures in the current video sequence have a width equal to a picture width, wraparound motion compensation may apply to all subpictures in the current video sequence. Therefore, since a subpicture related coding tool and a wraparound motion compensation related coding tool may be used together, it is possible to more improve encoding/decoding efficiency.

Figure 17:
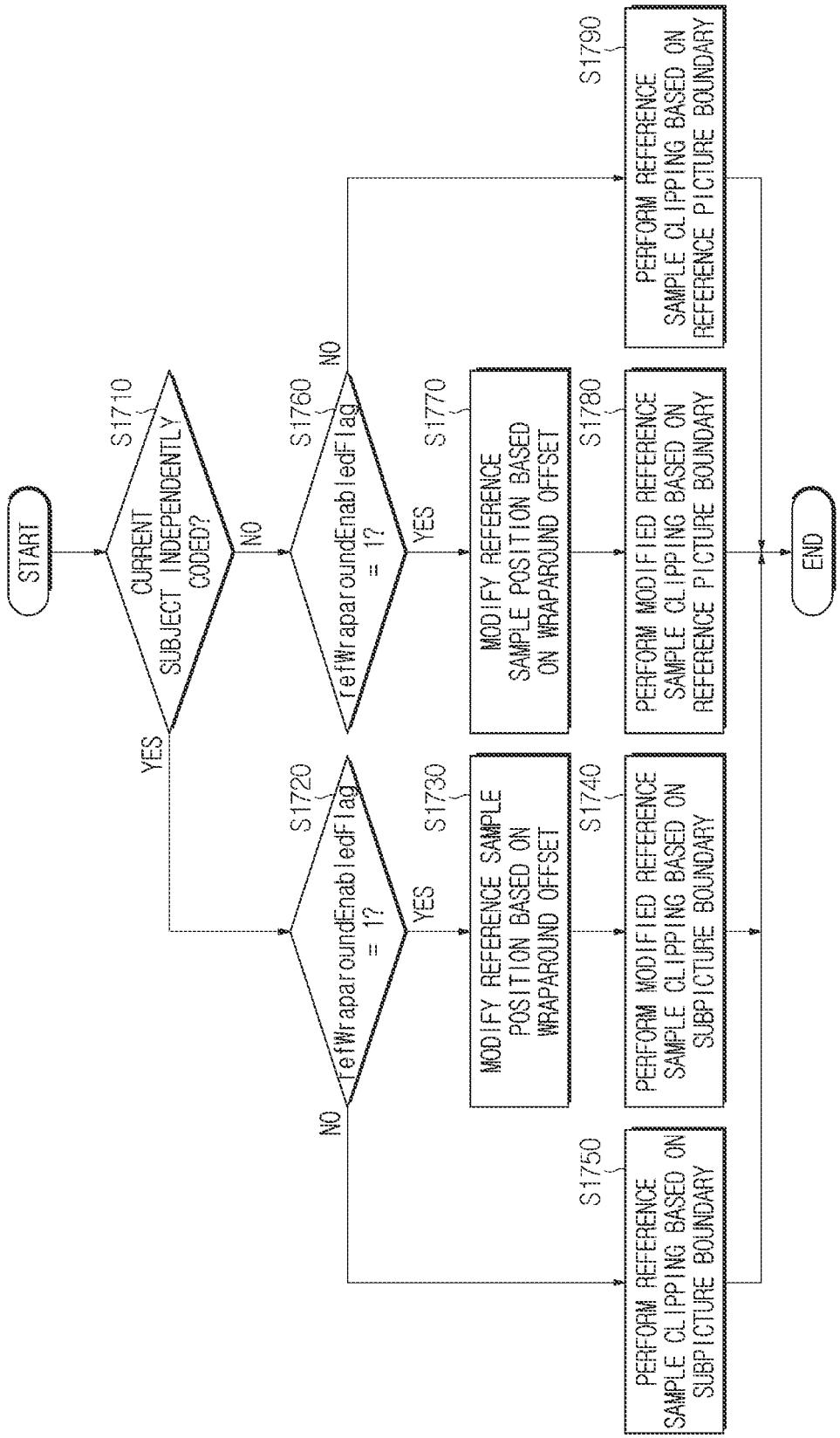
FIG. 17 is a flowchart illustrating a method of performing wraparound motion compensation based on a subpicture attribute by an image decoding apparatus according to an embodiment of the present disclosure.

FIG. 17 is a flowchart illustrating a method of performing wraparound motion compensation based on subpicture attributes, by an image decoding apparatus according to an embodiment of the present disclosure.

Referring to FIG. 17, the image decoding apparatus may determine whether a current subpicture is independently coded (S1710). In an example, whether the current subpicture is independently coded may be determined based on a higher level syntax, for example, a predetermined flag (e.g., subpic_treated_as_pic_flag) in an SPS. For example, when subpic_treated_as_pic_flag has a first value (e.g., 0), the current subpicture may not be independently coded. In contrast, when subpic_treated_as_pic_flag has a second value (e.g., 1), the current subpicture may be independently coded.

When the current subpicture is independently coded ("YES" of S1710), the image decoding apparatus may determine whether wraparound motion compensation is enabled for a current block (S1720).

Whether wraparound motion compensation is enabled for the current block may be determined based on a predetermined variable (e.g., refWraparoundEnabledFlag). For example, when refWraparoundEnabledFlag has a first value (e.g., 0), wraparound motion compensation may not be enabled for the current block. In contrast, when refWraparoundEnabledFlag has a second value (e.g., 1), wraparound motion compensation may be enabled for the current block. In an example, refWraparoundEnabledFlag may be set as shown in Equation 2 below.

refWraparoundEnabledFlag=*pps_ref_wraparound_enabled_flag&&!refPicIsScaled*   [Equation 2]

where, pps_ref_wraparound_enabled_flag may specify whether wraparound motion compensation is enabled for a current picture including the current block (it is enabled when the value is equal to 1 and is not enabled when the value is equal to 0). pps_ref_wraparound_enabled_flag may be obtained through a higher level syntax, for example, a picture parameter set (PPS). In addition, the variable refPicisScaled may specify whether reference picture scaling is performed (or whether the reference picture scaling is needed). For example, when reference picture scaling is performed, refPicIsScaled has a first value (e.g., 0), and, when reference picture scaling is not performed, refPicIsScale may have a second value (e.g., 1).

Referring to Equation 2, when wraparound motion compensation is not enabled for the current picture (e.g., pps_ref_wraparound_enabled_flag==0) or when reference picture scaling is performed (e.g., refPicIsScaled==1), refWraparoundEnabledFlag may have a first value (e.g., 0) specifying that wraparound motion compensation is not enabled for the current block. In contrast, when wraparound motion compensation is enabled for the current picture (e.g., pps_ref_wraparound_enabled_flag==1) and reference picture scaling is not performed (e.g., refPicIsScaled==0), refWraparoundEnabledFlag may have a second value (e.g., 1) specifying that wraparound motion compensation is enabled for the current block. Wraparound motion compensation for the reference picture and reference picture scaling may be selectively performed.

In an embodiment, a variable SliceRefWraparoundEnabledFlag may be defined and derived as follows in relation to whether wraparound motion compensation is enabled.

SliceRefWraparoundEnabledFlag may be set equal to the above-described pps_ref_wrap_around_enabled_flag.

When SliceRefWraparoundEnabledFlag has a second value (e.g., 1), subpic_treated_as_pic_flag[i] has a second value (e.g., 1) (that is, when a current subpicture is independently coded) for a current subpicture (that is, a subpicture, to which a current slice belongs), and the width of the current subpicture is different from that of a picture, the value of SliceRefWraparoundEnabledFlag may be set equal to a first value (e.g., 0).

When SliceRefWraparoundEnabledFlag has a second value (e.g., 1) and reference picture is not scaled, SliceRefWraparoundEnabledFlag may be used to enable the above-described refWraparoundEnabledFlag (that is, refWraparoundEnabledFlag=1).

The derivation process of the SliceRefWraparoundEnabledFlag may be defined as semantics in a slice header. A detailed example thereof is shown in Table 5.

TABLE 5

| General slice header semantics |
| --- |
| The variables SliceRefWraparoundEnabledFlag is derived as follows:<br>   SliceRefWraparoundEnabledFlag = pps_ref_wraparound_enabled_flag<br>   if( SliceRefWraparoundEnabledFlag )<br>      if( subpic_treated_as_pic_flag[ CurrSubpicIdx ] && subpic_width_minus1[ CurrSubpicIdx ] +<br>   1 < Ccil( pic_width_in_luma_samples ÷ CtbSizeY ) )<br>        SliceRefWraparoundEnabledFlag = 0 |

Referring to Table 5, SliceRefWraparoundEnabledFlag may be set equal to pps_ref_wraparound_enabled_flag. In addition, when SliceRefWraparoundEnabledFlag has a second value (e.g., 1), subpic_treated_as_pic_flag[CurrSubpicIdx] has a second value (e.g., 1) and subpic_width_minus1[CurrSubpicIdx]+1 is less than Ceil(pic_width_in_luma_samples÷CtbSizeY), the value of SliceRefWraparoundEnabledFlag may be reset to be equal to a first value (e.g., 0).

When wraparound motion compensation is enabled for the current block ("YES" of S1720), the image decoding apparatus may modify the position of the reference sample using a wraparound offset (S1730).

The wraparound offset may be set to an ERP width before padding of the current picture. Here, the ERP width may mean the width of an original picture (that is, an ERP picture) of an ERP format obtained from the 360-degree image. The wraparound offset may be determined based on a predetermined syntax element (e.g., pps_ref_wraparound_offset) obtained through a higher level syntax, for example, a picture parameter set (PPS). In addition, the x-coordinate of the reference sample may be shifted using the wraparound offset in a positive or negative direction.

The image decoding apparatus may clip the modified reference sample position based on the subpicture boundary (S1740). Therefore, the position of the reference sample may be included in the subpicture boundary.

In contrast, when wraparound motion compensation is not enabled for the current block ("NO" of S1720), the image decoding apparatus may clip the position of the reference sample based on the subpicture boundary (S1750). Therefore, the position of the reference sample may be included in the subpicture.

As described above, when the current subpicture is independently coded, clipping operation for the reference sample position may be performed based on the boundary of the subpicture regardless of whether wraparound motion compensation is enabled for the current block (S1740 and S1750). This may be because the dependently coded subpicture has continuity based on the boundary of the subpicture, not based on the boundary of the reference picture.

Returning to step S1710, when the current subpicture is not independently coded ("NO" of S1710), the image decoding apparatus may determine whether wraparound motion compensation is enabled for the current block (S1760). As described above, whether wraparound motion compensation is enabled for the current block may be determined based on a predetermined variable (e.g., refWraparoundEnabledFlag).

When wraparound motion compensation is enabled for the current block ("YES" of S1760), the image decoding apparatus may modify the position of the reference sample using a wraparound offset (S1770). In addition, the image decoding apparatus may clip the modified reference sample position based on the reference picture boundary (S1780). Therefore, the position of the reference sample may be included in the reference picture boundary.

In contrast, when wraparound motion compensation is not enabled for the current block ("NO" of S1760), the image decoding apparatus may clip the reference sample position based on the reference picture boundary (S1790).

As described above, when the current subpicture is not independently coded, clipping operation for the reference sample position may be performed based on the reference picture boundary regardless of whether wraparound motion compensation is enabled for the current block (S1780, S1790). This may be because the subpicture which is not dependently coded has continuity based on the reference picture boundary, not based on the subpicture boundary.

Meanwhile, the above-described clipping operation may be performed using any one of a luma sample bilinear interpolation process, a luma sample interpolation process, a luma integer sample fetching process or a chroma sample interpolation process. In addition, according to the embodiments of the present disclosure, wraparound motion compensation may be performed even when the current subpicture is independently coded. Accordingly, the above-described process 1 of Tables 1 to 4 may be modified as shown in Tables 6 to 9 below.

TABLE 6

Luma sample bilinear interpolation process

The luma locations in full-sample units (xInti, yInti) are derived as follows for i = 0 . . . 1:
(1) Process 1
  If subpic_treated_as_pic_flag[ CurrSubpicIdx ] is equal to 1, the following applies:
  1) xInti=Clip3(SubpicLeftBoundaryPos, SubpicRightBoundaryPos, refWraparoundEnabledFlag ?
  ClipH( ( PpsRefWraparoundOffset ) * MinCbSizeY, picW, (xInt$_L$ + i ) ) : xInt$_L$ + i ) . . .     (A610)

TABLE 7

Luma sample interpolation filtering process

The luma locations in full-sample units (xInti, yInti ) are derived as follows for i = 0 . . . 1:
(1) Process 1
  If subpic_treated_as_pic_flag[ CurrSubpicIdx ] is equal to 1, the following applies:
  1) xInti=Clip3(SubpicLeftBoundaryPos,SubpicRightBoundaryPos, refWraparoundEnabledFlag ?
  ClipH( ( PpsRefWraparoundOffset ) * MinCbSizeY, picW, xInti ) : xInti) . . .     (A710)

TABLE 8

Luma integer sample fetching process

The luma locations in full-sample units ( xInt, yInt) are derived as follows:
(1) Process 1
  If subpic_treated_as_pic_flag[ CurrSubpicIdx ] is equal to 1, the following applies:
  1) xInt=Clip3(SubpicLeftBoundaryPos, SubpicRightBoundaryPos, refWraparoundEnabledFlag ?
  ClipH( (PpsRefWraparoundOffset) * MinCbSizeY, picW, xInt$_L$ ) : xInt$_L$ ) . . .     (A810)

TABLE 9

Chroma sample interpolation process

The variable xOffset is set equal to ( PpsRefWraparoundOffset ) * MinCbSizeY )/SubWidthC.
The luma locations in full-sample units ( xInt, yInt) are derived as follows:

TABLE 9-continued

Chroma sample interpolation process (1) Process 1
 If subpic_treated_as_pic_flag[ CurrSubpicIdx ] is equal to 1, the following applies:
  1) xInti = Clip3( SubpicLeftBoundaryPos / SubWidthC, SubpicRightBoundaryPos / SubWidthC,
   refWraparoundEnabledFlag ? ClipH( xOffset, picW$_C$, xInti ) : xInti ) . . .     (A910)

Referring to Tables 6 to 9, unlike the existing clipping operation, even when the current subpicture is independently coded, if wraparound motion compensation is enabled, the reference sample position may be clipped based on the subpicture boundary (A610 to A910).

Specifically, when the current subpicture is independently coded, Process 1 may be performed. For the x-coordinate of the reference sample, a wraparound offset (e.g., PpsRefWraparoundOffset) is selectively applicable depending on whether wraparound motion compensation is enabled for the current block (e.g., refWraparoundEnabledFlag==1), and clipping operation based on the subpicture boundary may be performed for the selectively applied x-coordinate. However, for the y-coordinate of the reference sample, as described above with reference to Tables 1 to 4, general clipping operation (or padding operation) based on the subpicture boundary may be performed. This may mean that wraparound motion compensation is applied to only the left and right boundaries of the reference picture (that is, horizontal wraparound motion compensation).

In Table 9, xOffset which is a wraparound offset used for wraparound motion compensation (see Table 8) using the chroma sample interpolation process may be derived as shown in Equation 3 below.

xOffset=(PpsRefWraparoundOffset)*Min *CbSizeY*/
 SubWidth*C*     [Equation 3]

Referring to Equation 3, the wraparound offset xOffset) may be computed by multiplying offset information PpsRefWraparoundOffset obtained from a higher level syntax, for example, a picture parameter set (PPS) by a minimum width MinCbSizeY of a coding block (CB) and then dividing the multiplied value by a width ratio SubWidthC of the luma-chroma sample.

In an embodiment, as described above, when a variable SliceRefWraparoundEnabledFlag is newly defined, refWraparoundEnabledFlag of Tables 6 to 9 may be derived as shown in Equation 4 below, without using pps_ref_wraparound_enabled_flag obtained from the PPS.

refWraparoundEnabledFlag=SliceRefWraparound
 EnabledFlag&&!refPicIsScaled     [Equation 4]

Referring to Equation 4, when SliceRefWraparoundEnabledFlag has a first value (e.g., 0) or refPicIsScaled has a second value (e.g., 1), refWraparoundEnabledFlags may be set to be equal to a first value (e.g., 0). In contrast, when SliceRefWraparoundEnabledFlag has a second value (e.g., 1) and refPicIsScaled has a first value (e.g., 0), refWraparoundEnabledFlags may be set to be equal to a second value (e.g., 1).

In an embodiment, variables LeftBoundaryPos, RightBoundaryPos, TopBoundaryPos and/or BottomBoundaryPos specifying the boundaries of a subpicture may be newly defined. The new variables may indicate the positions of the boundaries of the subpicture when subpic_treated_as_flag has a first value (e.g., 0) or a second value (e.g., 1). A detailed example of a method of deriving the new variables is shown in Table 10.

TABLE 10

The new variables related to the subpicture boundaries

The variables LeftBoundayPos, RightBoundayPos, TopBoundayPos, and BottomBoundaryPos are derived as follows.
 LeftBoundaryPos = 0
 RightBoundaryPos =pic_width_in_luma_samples − 1
 TopBoundaryPos = 0
 BottomBoundaryPos = pic_height_in_luma_samples − 1
 if( subpic_treated_as_pic_flag[ CurrSubpicIdx ] ) {
  LeftBoundaryPos = subpic_ctu_top_left_x[ CurrSubpicIdx ] * CtbSizeY
  RightBoundaryPos = Min( pic_width_max_in_luma_samples − 1,
   ( subpic_ctu_top_left_x[ CurrSubpicIdx ] +
   subpic_width_minus1[ CurrSubpicIdx ] +1 )* CtbSizeY − 1 )
  TopBoundaryPos = subpic_ctu_top_left_y[ CurrSubpicIdx ] *CtbSizeY
  BottomBoundaryPos = Min( pic_height_max_in_luma_samples − 1,
   ( subpic_ctu_top_left_y[ CurrSubpicIdx ] +
   subpic_height_minus1[ CurrSubpicIdx ] + 1 ) * CtbSizeY − 1 )
 }

Referring to Table 10, the initial value of the variable LeftBoundaryPos may be set to 0. In addition, the initial value of the variable RightBoundaryPos may be set to pic_width_in_luma_samples−1. In addition, the initial value of the variable TopBoundaryPos may be set to 0. In addition, the initial value of BottomBoundaryPos may be set to pic_height_in_luma_samples−1.

When the current subpicture is independently coded (i.e., subpic_treated_as_pic_flag[CurrSubpicIdx]==1), the values of LeftBoundaryPos, RightBoundaryPos, TopBoundaryPos and BottomBoundaryPos may be updated. Specifically, the value of LeftBoundaryPos may be updated to subpic_ctu_top_left_x[CurrSubpicIdx]*CtbSizeY. In addition, the value of RightBoundaryPos may be updated to Min(pic_width_max_in_luma_samples−1, (subpic_ctu_top_left_x[CurrSubpicIdx]+subpic_width_minus1[CurrSubpicIdx]+1)*CtbSizeY−1). Here, Min(x, y) means a function which outputs the smaller value of x and y. In addition, the value of TopBoundaryPos may be updated to subpic_ctu_top_left_y[CurrSubpicIdx]*CtbSizeY. In addition, the value of BottomBoundaryPos may be updated to Min(pic_height_max_in_luma_samples−1, (subpic_ctu_top_left_y[CurrSubpicIdx]+subpic_height_minus1[CurrSubpicIdx]+1)*CtbSizeY−1).

The processes of Tables 6 to 9 above may be modified using the new variables for the subpicture boundary as shown in Tables 11 to 14.

TABLE 11

Luma sample bilinear interpolation process

The luma locations in full-sample units (xInti, yInti) are derived as follows for i = 0 . . . 1:

1) xInti = Clip3(LeftBoundaryPos, RightBoundaryPos, refWraparoundEnabledFlag ?ClipH( ( PpsRef WraparoundOffset ) * MinCbSizeY, picW, ($xInt_L$ + i ) ) : $xInt_L$ + i ) . . .  (A1110)

2) yInti = Clip3( TopBoundaryPos, BottomBoundaryPos, yIntL + i )

TABLE 12

Luma sample interpolation filtering process

The luma locations in full-sample units ( xInti, yInti ) are derived as follows for i = 0 . . . 1:

1) xInti = Clip3(LeftBoundaryPos, RightBoundaryPos, refWraparoundEnabledFlag ? ClipH( ( PpsRef WraparoundOffset ) * MinCbSizeY, picW, xInti ) : xInti ) . . .  (A1210)

2) yInti = Clip3( TopBoundaryPos, BottomBoundaryPos, yInti )

TABLE 13

Luma integer sample fetching process

The luma locations in full-sample units (xInt, yInt) are derived as follows:

1) xInt = Clip3( LeftBoundaryPos, RightBoundaryPos, refWraparoundEnabledFlag ? ClipH( (PpsRefWraparoundOffset ) * MinCbSizeY, picW, $xInt_L$ ) : $xInt_L$ ) . . .  (A1310)

2) yInt = Clip3( TopBoundaryPos, BottomBoundaryPos, $yInt_L$ )

TABLE 14

Chroma sample interpolation process

The variable xOffset is set equal to ( PpsRefWraparoundOffset ) * MinCbSizeY)/SubWidthC The luma locations in full-sample units ( xInt, yInt ) are derived as follows:

1) xInti = Clip3( LeftBoundaryPos/SubWidthC, RightBoundaryPos/SubWidthC, refWraparoundEnabledFlag ? ClipH( xOffset, $picW_C$ xInti ) : xInti ) . . .  (A1410)

2) yInti = Clip3( TopBoundaryPos/SubHeightC, BottomBoundaryPos/SubHeightC, yInti )

The processes of Tables 11 to 14 are equal to the processes of Tables 6 to 9 except that new variables for the subpicture boundary are used and thus a repeated description will be omitted. Meanwhile, a temporal motion vector prediction (TMVP) derivation process, a subblock-based temporal merge candidate derivation procedure and a reconstructed affine control point motion vector merge candidate derivation process may be performed using the new variables for the subpicture boundary.

FIG. 18 is a view illustrating an example of an SPS according to an embodiment of the present disclosure. A repeated description of the SPS described above with reference to FIGS. 9 and 14a will be omitted.

Referring to FIG. 18, the SPS may include a flag sps_ref_wraparound_enabled_flag specifying whether wraparound motion compensation is enabled at a sequence level. For example, sps_ref_wraparound_enabled_flag equal to a first value (e.g., 0) may specify that (horizontal) wraparound motion compensation is applied in inter prediction. In contrast, sps_ref_wraparound_enabled_flag equal to a second value (e.g., 1) may specify that (horizontal) wraparound motion compensation is not applied.

It is a requirement of bitstream conformance that, when a syntax element subpic_width_minus1[i], which specifies the width of an i-th subpicture, plus 1 is different from (pic_width_max_in_luma_samples+CtbSizeY−1)>>Ctb Log 2SizeY) for all subpictures in a picture, the value of sps_ref_wraparound_enabled_flag shall be equal to a first value (e.g., 0). Here, i may be in the range of 0 to the value of a syntax element sps_num_subpics_minus1, which specifies the number of subpictures in the picture, inclusive.

In an embodiment, sps_ref_wraparound_enabled_flag may be signaled before syntax elements for the subpicture (e.g., subpic_info_present_flag, sps_num_subpics_minus1, etc.). In addition, when sps_ref_wraparound_enabled_flag has a second value (e.g., 1), the syntax elements for the position and width of the subpicture (e.g., subpic_ctu_top_left_x[i], subpic_ctu_top_left_y[i] and subpic_width_minus1[i]) may not be signaled.

In this case, the value of subpic_ctu_top_left_x[i] which is a syntax element specifying the horizontal position of the top left CTU of the i-th subpicture in unit of CtbSizeY may be inferred to be equal to a first value (e.g., 0). In addition, subpic_ctu_top_left_y[i] which is a syntax element specifying the vertical position of the top left CTU of the i-th subpicture in unit of CtbSizeY may be inferred to be equal to subpic_ctu_top_left_y[i−1]+subpic_height_minus1[i−1]. Here, subpic_height_minus1[i−1] may specify the height of an (i−1)-th subpicture minus 1. In addition, a syntax element subpic_width_minus1[i] specifying the width of the subpicture may be inferred to be equal to ((pic_width_max_in_luma_samples+CtbSizeY−1)>>Ctb Log 2SizeY)−1. Here, pic_width_max_in_luma_samples may indicate the maximum picture width in the luma sample unit, CtbSizeY may indicate the width of a coding tree block (CTB), and Ctb Log 2SizeY may indicate the log scale value of the CTB width.

In another embodiment, the syntax elements for the position and width of the subpicture shall be inferred to be the above-described values, when sps_ref_wraparound_enabled_flag has a second value (e.g., 1).

Referring to FIG. 18, subpic_ctu_top_left_x[i], subpic_ctu_top_left_y[i] and subpic_width_minus1[i] may be signaled only when sps_ref_wraparound_enabled_flag has a first value (e.g., 0) (1810).

subpic_ctu_top_left_x[i] may specify the horizontal position of the top left CTU of the i-th subpicture in unit of CtbSizeY. The length of subpic_ctu_top_left_x[i] may be Ceil(Log 2((pic_width_max_in_luma_samples+CtbSizeY−1)>>Ctb Log 2SizeY)) bits. When subpic_ctu_top_left_x[i] is not present in the bitstream (that is, it is not signaled), the value of subpic_ctu_top_left_x[i] may be inferred to be equal to 0.

In addition, subpic_ctu_top_left_y[i] may specify the vertical position of the top left CTU of the i-th subpicture in unit of CtbSizeY. The length of subpic_ctu_top_left_y[i] may be Ceil(Log 2((pic_height_max_in_luma_samples+CtbSizeY−1)>>Ctb Log 2SizeY)) bits. When subpic_ctu_top_left_y[i] is not present in the bitstream (that is, it is not signaled), the following is applicable.

When the value of i is greater than 0 and sps_ref_wraparound_enabled_flag has a second value (e.g., 1), the value of subpic_ctu_top_left_y[i] may be inferred to be equal to (subpic_ctu_top_left_y[i−1]+subpic_height_minus1[i−1]+1).

Otherwise, the value of subpic_ctu_top_left_y[i] may be inferred to be equal to (((pic_width_max_in_luma_samples+CtbSizeY−1)>>Ctb Log 2SizeY)−subpic_ctu_top_left_x[i]−1).

In addition, subpic_width_minus1[i] plus 1 may specify the width of the i-th subpicture in unit of CtbSizeY. The length of subpic_width_minus1[i] may be Ceil(Log 2((pic_width_max_in_luma_samples+CtbSizeY−1)>>Ctb Log 2SizeY)) bits. When subpic_width_minus1[i] is not present in the bitstream (that is, it is not signaled), the following is applicable.

When sps_ref_wraparound_enabled_flag has a second value (e.g., 1), the value of subpic_width_minus1[i] may be inferred to be equal to ((pic_width_max_in_luma_samples+CtbSizeY−1)>>Ctb Log 2SizeY)−1).

Otherwise, the value of subpic_width_minus1[i] may be inferred to be equal to (((pic_width_max_in_luma_samples+CtbSizeY−1)>>Ctb Log 2SizeY)−subpic_ctu_top_left_x[i]−1).

Meanwhile, according to another embodiment, the above-described inference conditions of subpic_ctu_top_left_x[i], subpic_ctu_top_left_y[i] and subpic_width_minus1[i] shall be constrained. For example, it is a constraint of bitstream conformance that, when sps_ref_wraparound_enabled_flag has a second value (e.g., 1), the value of subpic_ctu_top_left_x[i] is inferred to be equal to a first value (e.g., 0). In addition, it is a constraint of bitstream conformance that, when sps_ref_wraparound_enabled_flag has a second value (e.g., 1), subpic_ctu_top_left_y[i] is inferred to be equal to subpic_ctu_top_left_y[i−1]+subpic_height_minus1[i−1]. In addition, it is a constraint of bitstream conformance that, when sps_ref_wraparound_enabled_flag has a second value (e.g., 1), subpic_width_minus1[i] is inferred to be equal to ((pic_width_max_in_luma_samples+CtbSizeY−1)>>Ctb Log 2SizeY)−1.

According to the embodiment of the present disclosure, wraparound motion compensation is applicable to the current subpicture regardless of whether the current subpicture is independently coded. In this case, when the current subpicture is independently coded, wraparound motion compensation may be performed based on the subpicture boundary. In contrast, when the current subpicture is not independently coded, wraparound motion compensation may be performed based on the reference picture boundary. Therefore, since a subpicture related coding tool and a wraparound motion compensation related coding tool may be used together, it is possible to more improve encoding/decoding efficiency.

Hereinafter, an image encoding/decoding method according to an embodiment of the present disclosure will be described in detail with reference to FIGS. 19 and 20.

Figure 19:
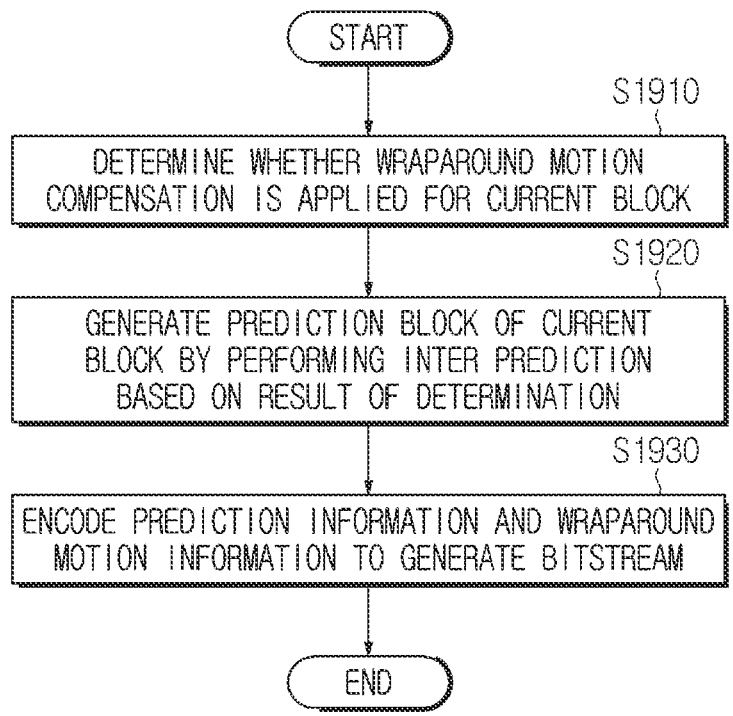
FIG. 19 is a flowchart illustrating an image encoding method according to an embodiment of the present disclosure.

FIG. 19 is a flowchart illustrating an image encoding method according to an embodiment of the present disclosure.

The image encoding method of FIG. 19 may be performed by the image encoding apparatus of FIG. 2. For example, steps S1910 and step S1920 may be performed by the inter predictor 180 and step S1930 may be performed by the entropy encoder 190.

Referring to FIG. 19, the image encoding apparatus may determine whether wraparound motion compensation is applied to a current block (S1910).

In one embodiment, the image encoding apparatus may determine whether wraparound motion compensation is enabled, based on whether there are one or more subpictures independently coded and having a width different from a picture width in a current video sequence including a current block. For example, when there are one or more subpictures independently coded and having a width different from a picture width in the current video sequence, the image encoding apparatus may determine that wraparound motion compensation is disabled. In contrast, when all independently coded subpictures in the current video sequence have the same width as the picture width, the image encoding apparatus may determine that wraparound motion compensation is enabled based on a predetermined wraparound constraint. Here, an example of the wraparound constraint was described above with reference to FIGS. 16 to 18.

In addition, the image encoding apparatus may determine whether wraparound motion compensation is applied to the current block, based on the determination. For example, when wraparound motion compensation is disabled for the current picture, the image encoding apparatus may determine that wraparound motion compensations is not performed with respect to the current block. In contrast, when wraparound motion compensation is enabled for the current picture, the image encoding apparatus may determine that wraparound motion compensation is performed with respect to the current block.

In an embodiment, the wraparound motion compensation for the current block may be skipped based on that the current subpicture is independently coded and has a width different from a width of the current picture.

The image encoding apparatus may generate a prediction block of the current block, by performing inter prediction based on the result of determination of step S1910 (S1920).

In an embodiment, the wraparound motion compensation may be performed based on either boundaries of a current subpicture including the current block or boundaries of a reference picture of the current block, based on whether the current subpicture is independently coded or not. For example, when the current subpicture is independently coded (e.g., subpic_treated_as_pic_flag==1), the motion compensation for the current block may be performed based on the boundaries of the current subpicture. In contrast, when the current subpicture is not independently coded (e.g., subpic_treated_as_pic_flag==0), the motion compensation for the current block may be performed based on the boundaries of the reference picture.

In an embodiment, the wraparound motion compensation for the current block may be performed by modifying a x-coordinate of a reference block in the reference picture based on the wraparound offset, the reference block being specified by a motion vector of the current block. In an example, the wraparound offset may be set to an ERP width before padding of the current picture. Here, the ERP width may mean the width of an original picture (that is, an ERP picture) of an ERP format obtained from the 360-degree image. In addition, the wraparound motion compensation for the current block may be performed by clipping the modified x-coordinate of the reference block into a range of boundaries of either the current subpicture or the reference picture.

In an embodiment, the wraparound motion compensation for the current block may be performed based on a left boundary position and a right boundary position, the left boundary position and the right boundary position being set based on whether the current subpicture is independently coded. For example, when the current subpicture is independently coded, the left boundary position and the right boundary position may be set as a left boundary position and a right boundary position of the current subpicture. In contrast, when the current subpicture is not independently coded, the left boundary position and the right boundary position may be set as a left boundary position and a right boundary position of the reference picture. As such, since whether or not the current subpicture is independently coded is considered in the boundary position used to clip the position of the reference block, there is no need to separately determine whether or not the current subpicture is independently coded. Accordingly, a motion compensation process for generating a prediction block of the current block may be more simplified. The image encoding apparatus may encode the inter prediction information of the current block and wraparound information for wraparound motion compensation to generate a bitstream (S1930).

In an embodiment, wraparound information may include a first flag (e.g., pps_ref_wraparound_enabled_flag) specifying whether wraparound motion compensation is enabled for a current picture. The first flag may have a first value (e.g., 0) specifying that wraparound motion compensation is disabled for the current picture, based on that the wraparound motion compensation is enabled for a current video sequence including the current block (e.g., sps_ref_wraparound_enabled_flag==0). In addition, the first flag may have a first value (e.g., 0) specifying that wraparound motion compensation is disabled for the current picture, based on a predetermined condition regarding the width of a coding tree block (CTB) in the current picture and the width of the current picture. For example, when the width (e.g., CtbSizeY) of the CTB in the current picture is greater than the width (e.g., pic_width_in_luma_samples) of the picture, pps_ref_wraparound_enabled_flag shall have a first value (e.g., 0).

In an embodiment, wraparound information may further include a wraparound offset (e.g., pps_ref_wraparound_offset) based on that the wraparound motion compensation is enabled for the current picture. The image encoding apparatus may perform wraparound motion compensation based on the wraparound offset.

Figure 20:
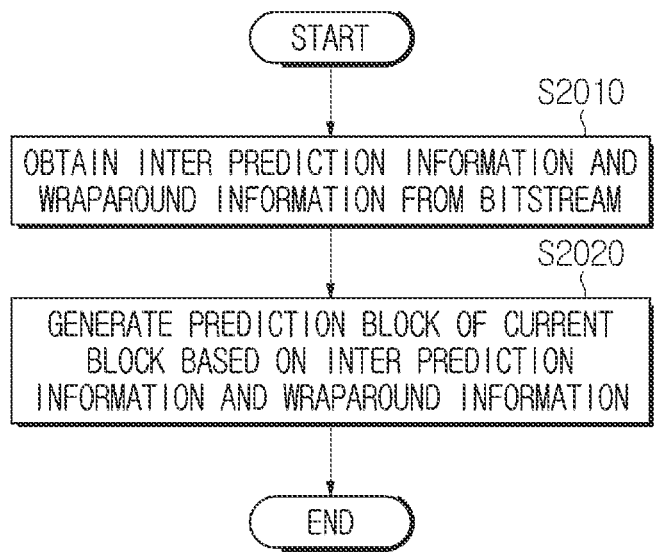
FIG. 20 is a flowchart illustrating an image decoding method according to an embodiment of the present disclosure.

FIG. 20 is a flowchart illustrating an image decoding method according to an embodiment of the present disclosure.

The image decoding method of FIG. 20 may be performed by the image decoding apparatus of FIG. 3. For example, steps S2010 and S2020 may be performed by the inter predictor 260.

Referring FIG. 20, the image decoding apparatus may obtain inter prediction information of the current block and wraparound information from a bitstream (S2010). Here, the inter prediction information of the current block may include motion information of the current block, such as a reference picture index, difference motion vector information, etc. The wraparound information may include a first flag (e.g., pps_ref_wraparound_enabled_flag) specifying whether wraparound motion compensation is enabled for the current picture. The first flag may have a first value (e.g., 0) specifying that wraparound motion compensation is disabled for the current picture, based on that the wraparound motion compensation is disabled for a current video sequence including the current block (e.g., sps_ref_wraparound_enabled_flag==0). In addition, the first flag may have a first value (e.g., 0) specifying that wraparound motion compensation is disabled for the current picture, based on a predetermined condition regarding the width of a coding tree block (CTB) in the current picture and the width of the current picture. For example, when the width (e.g., CtbSizeY) of the CTB in the current picture is greater than the width (e.g., pic_width_in_luma_samples) of the picture, sps_ref_wraparound_enabled_flag shall have a first value (e.g., 0).

In an embodiment, each of a top-left position and a width of the current subpicture may be set (or inferred) to a predetermined value, based on that the wraparound motion compensation is enabled for a current video sequence including the current block (e.g., sps_ref_wraparound_enabled_flag==1). For example, in this case, a x-coordinate of the top-left position of the current subpicture (e.g., subpic_ctu_top_left_x[i]) may be set equal to 0, and a y-coordinate of the top-left position of the current subpicture (e.g., subpic_ctu_top_left_y[i]) may be set equal to a y-coordinate of a first subpicture (e.g., subpic_ctu_top_left_y[i−1]), which is decoded prior to the current picture, plus a height (e.g., subpic_height_minus1[i−1]) of the current subpicture. In addition, a width (e.g., subpic_width_minus[i]) of the current subpicture may be set equal to a width (e.g., ((pic_width_max_in_luma_samples+CtbSizeY−1)>>Ctb Log 2SizeY)−1) of the current picture.

The image decoding apparatus may generate the prediction block of the current block based on the inter prediction information and wraparound information obtained from the bitstream (S2020).

In an embodiment, based on that the first flag (e.g., pps_ref_wraparound_enabled_flag) has a predetermined value (e.g., 1) specifying that the wraparound motion compensation is enabled for the current block, a prediction block of the current block may be generated by performing the wraparound motion compensation.

In an embodiment, the wraparound motion compensation for the current block may be performed by modifying a x-coordinate of a reference block in the reference picture based on the wraparound offset. In addition, the wraparound motion compensation may be performed by clipping the modified x-coordinate of the reference block within either a boundary of the current subpicture or a boundary of the reference picture. In this case, a boundary used for the clipping may be determined based on whether the current subpicture including the current block is coded independently (e.g., subpic_treated_as_pic_flag). For example, when the current subpicture is coded independently (e.g., subpic_treated_as_pic_flag==1), the x-coordinate of the reference block may be clipped within the boundary of the current subpicture. In contrast, when the current subpicture is not coded independently (e.g., subpic_treated_as_pic_flag==0), the x-coordinate of the reference block may be clipped within the boundary of the reference picture.

Meanwhile, in an embodiment, the wraparound motion compensation for the current block may be skipped based on that the reference picture is scaled. In addition, the wraparound motion compensation for the current block may be skipped based on that the current subpicture is coded independently and has a width different from a width of the current picture.

In an embodiment, the wraparound motion compensation for the current block may be performed based on a left boundary position and a right boundary position, the left boundary position and the right boundary position being set based on whether the current subpicture is independently coded. For example, when the current subpicture is independently coded, the left boundary position and the right boundary position may be set as a left boundary position and a right boundary position of the current subpicture. In contrast, when the current subpicture is not independently coded, the left boundary position and the right boundary position may be set as a left boundary position and a right boundary position of the reference picture. As such, since whether or not the current subpicture is independently coded is considered in the boundary position used to clip the position of the reference block, there is no need to separately determine whether or not the current subpicture is independently coded. Accordingly, a motion compensation process for generating a prediction block of the current block may be more simplified.

According to the image encoding/decoding method according to an embodiment of the present disclosure, even if the current subpicture is independently coded, wraparound motion compensation may be available based on a predetermined condition. Therefore, since a subpicture related coding tool and a wraparound motion compensation related coding tool may be used together, it is possible to more improve encoding/decoding efficiency.

The name of the syntax element described in the present disclosure may include information on a position where the corresponding syntax element is signaled. For example, a syntax element starting with "sps_" may mean that the corresponding syntax element is signaled in a sequence parameter set (SPS). In addition, a syntax element starting with "pps_", "ph_", "sh_" may mean that the corresponding syntax element is signaled in a picture parameter set (PPS), a picture header and a slice header, respectively.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 21:
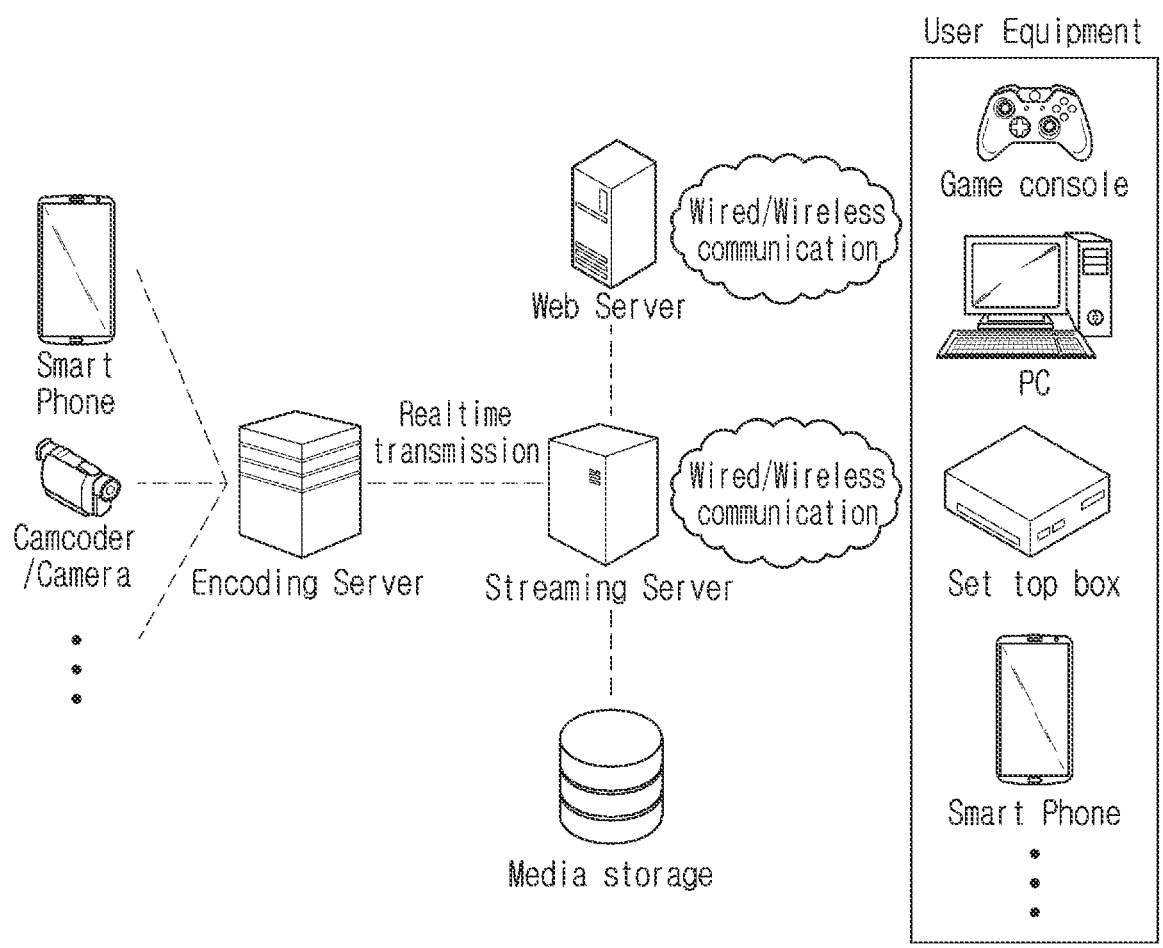
FIG. 21 is a view illustrating a content streaming system, to which an embodiment of the present disclosure is applicable.

FIG. 21 is a view showing a content streaming system, to which an embodiment of the present disclosure is applicable.

As shown in FIG. 21, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

FIG. 22 is a view schematically illustrating architecture for providing a three-dimensional image/video service in which embodiment(s) of the present disclosure may be utilized.

FIG. 22 may illustrate a 360-degree or omnidirectional video/image processing system. In addition, the system of FIG. 22 may be, for example, implemented in an extended reality (XR) supporting apparatus. That is, the system may provide a method of providing virtual reality to a user.

Extended reality collectively refers to virtual reality (VR), augmented reality (AR) and mixed reality (MR). VR technology provides only a CG image of objects or backgrounds of a real world, AR technology provide virtually created CG images on an image of real objects, and MR technology is computer graphic technology for mixing, combining and providing virtual objects in a real world.

MR technology is similar to AR technology in that real objects and virtual objects are displayed together. However, virtual objects are used to complement real objects in AR technology, whereas virtual objects and real objects are used with the equal characteristics in MR technology.

XR technology is applicable to head-mount display (HMD), head-up display (HUD), cellular phones, tablet PCs, laptops, desktops. TVs, digital signages, etc., and a device, to which XR technology is applied, may be referred to as an XR device. The XR device may include a first digital device and/or a second digital device, which will be described below.

360-content means overall content for implementing and providing VR, and may include a 360-degree video and/or a 360-degree audio. A 360-degree video may mean a video or image content simultaneously captured or played in all directions (360 degrees or less), which is necessary to provide VR. Hereinafter, a 360 video may mean a 360-degree video. A 360-degree audio is also audio content for providing VR and may mean spatial audio content which enables a sound source to be recognized as being located in a specific three-dimensional space. 360-degree content may be generated, processed and transmitted to users, and users may consume VR experience using 360-degree content. A 360-degree video may be referred to as an omnidirectional video, and a 360-degree image may be referred to as an omnidirectional image. Hereinafter, the 360-degree video ill be focused upon and the embodiment(s) of the present disclosure are not limited to VR and may include processing of video/image content such as AR or MR. The 360-degree video may mean a video or image displayed in 3D spaces having various shapes according to the 3D model, and, for example, the 360-degree video may be displayed on a spherical surface.

The present method particularly proposes a method of efficiently providing a 360-degree video. In order to provide the 360-degree video, first, the 360-degree video may be captured through one or more cameras. The captured 360-degree video may be transmitted through a series of processes and data received by a receiver may be processed to an original 360-degree video and rendered. Therefore, the 360-degree video may be provided to the user.

Specifically, the overall process for providing the 360-degree video may include a capture process, a preparation process, a delivery process, a processing process, a rendering process and/or a feedback process.

The capture process may mean a process of capturing an image or video at a plurality of views through one or more cameras. Image/video data shown in 2210 of FIG. 22 may be generated by the capture process. Each plane of 2210 of FIG. 22 may mean an image/video at each view. The plurality of captured image/video may be referred to as raw data. Metadata related to capture may be generated in the capture process.

For capture, special cameras for VR may be used. In some embodiments, when a 360-degree video for a virtual space generated by a computer is provided, capture through a real camera may not be performed. In this case, the capture process may be replaced simply by the process of generating related data.

The preparation process may be a process of processing the captured image/video and metadata generated in the capture process. The captured image/video may be subjected to a stitching process, a projection process, a region-wise packing process and/or an encoding process in the preparation process.

First, each image/video may be subjected to a stitching process. The stitching process may be a process of generating one panorama image/video or a spherical image/video by connecting captured images/videos.

Thereafter, the stitched image/video may be subjected to the projection process. In the projection process, the stitched image/video may be projected on a 2D image. This 2D image may be referred to as a 2D image frame according to the context. Projecting on a 2D image may be expressed as mapping to a 2D image. The projected image/video data may have the form of a 2D image shown in 2220 of FIG. 20.

Video data projected on the 2D image may be subjected to the region-wise packing process, in order to increase video coding efficiency. Region-wise packing may mean a process of dividing the video data projected on the 2D image according to the region and processing the video data. Here, the region may mean a region in which the 2D image, on which the 360-degree video data is projected, is divided. These regions may be obtained by equally or arbitrarily dividing the 2D image according to the embodiment. In addition, in some embodiments, the regions may be divided according to the projection scheme. The region-wise packing process is optional and may be omitted in the preparation process.

In some embodiments, this processing process may include a process of rotating each region or rearranging each region on the 2D image in order to increase video coding efficiency. For example, by rotating the regions such that specific sides of the regions are located close to each other, it is possible to increase coding efficiency.

In some embodiments, this processing process may include a process of increasing or decreasing resolution of a specific region, in order to differentiate resolution for each region on the 360-degree video. For example, resolution of regions corresponding to relatively more important areas on the 360-degree video may be higher than that of the other regions. The video data projected on the 2D image or the region-wise packed video data may be subjected to the encoding process through a video codec.

In some embodiments, the preparation process may further include an editing process. In the editing process, editing of the image/video data before/after projection may be further performed. Even in the preparation process, similarly, metadata on stitching/projection/encoding/editing may be generated. In addition, metadata on an initial view of video data projected on the 2D image or region of interest (ROI) may be generated.

The delivery process may be a process of processing and delivering the image/video data and metadata subjected to the preparation process. For delivery, processing according to an arbitrary delivery process may be performed. Data processed for delivery may be delivered through a broadcast network and/or broadband. This data may be delivered to the receiver in an on-demand manner. The receiver may receive data through various paths.

The processing process may mean a process of decoding the received data and reprojecting the projected image/video data on a 3D model. In this process, the image/video data projected on the 2D images may be reprojected in the 3D space. This process may be referred to as mapping or projection according to the context. In this case, the 3D space may have a shape which varies according to the 3D model. For example, the 3D model may include a sphere, a cube, a cylinder or a pyramid.

In some embodiments, the processing process may further include an editing process, an up-scaling process, etc. In this editing process, editing of the image/video data before/after reprojection may be further performed. When the image/video data is reduced, the size thereof may increase through up-scaling of samples in the up-scaling process. If necessary, operation of reducing the size through down-scaling may be performed.

The rendering process may mean a process of rendering and displaying the image/video data reprojected in the 3D space. In some expressions, reprojection and rendering may be collectively expressed as rendering on a 3D model. An image/video reprojected on the 3D model (or rendered on the 3D model) may have the shape shown in 2230 of FIG. 22. 2230 of FIG. 22 illustrates reprojection on a spherical 3D model. A user may view a partial area of the rendered image/video through a VR display. In this case, an area viewed by the user may have a shape shown in 2240 of FIG. 22.

The feedback process may mean a process of delivering a variety of feedback information capable of being obtained in the display process to a transmitter. Through the feedback process, interactivity may be provided in 360-degree video consumption. In some embodiments, head orientation information and viewport information indicating an area currently viewed by a user may be delivered to the transmitter in the feedback process. In some embodiments, the user may interact with those implemented in the VR environment. In this case, information related to interaction may be delivered to the transmitter or a service provider in the feedback process. In some embodiments, the feedback process may not be performed.

The head orientation information may mean information on the position, angle and motion of the head of the user. Based on this information, information on an area currently viewed by the user in the 360-degree video, that is, viewport information, may be computed.

The viewport information may be information on an area currently viewed by the user in the 360-degree video. Through this, gaze analysis may be performed to determine how the user consumes the 360-degree video or how much the user gazes a certain area of the 360-degree video. Gaze analysis may be performed by the receiver and delivered to the transmitter through a feedback channel. A device such as a VR display may extract a viewport area based on the position/direction of the head of the user, vertical or horizontal field of view (FOV) information supported by the device, etc.

Meanwhile, the 360-degree video/image may be processed based on a subpicture. A projected picture or packed picture including a 2D image may be divided into subpictures and processed in units of subpictures. For example, high resolution may be provided to specific subpicture(s) according to the user viewport or only specific subpicture(s) may be encoded and signaled to a reception device (a decoding device). In this case, the decoding device may receive a subpicture bitstream, reconstruct/decode the specific subpicture(s) and perform rendering according to the user viewport.

In some embodiments, the above-described feedback information may not only be delivered to the transmitter, but may also be consumed in the receiver. That is, decoding, reprojection and rendering process of the receiver may be performed using the above-described feedback information. For example, only the 360-degree video for the area currently viewed by the user may be preferentially decoded and rendered using the head orientation information and/or the viewport information.

Here, viewport or viewport area may mean an area viewed by the user in the 360-degree video. Viewpoint may be a point viewed by the user in the 360-degree video and may mean a center point of the viewport area. That is, the viewport is an area centered on the viewpoint and the size and shape of the area may be determined by the field of view (FOV).

In the entire architecture for providing the 360-degree video, the image/video data subjected to a series of processes such as capture/projection/encoding/delivery/decoding/reprojection/rendering may be referred to as 360-degree video data. The term 360-degree video data may include metadata or signaling information related to such image/video data.

In order to store and transmit media data such as audio or video, a standardized media file format may be defined. In some embodiments, a media file may have a file format based on ISO base media file format (BMFF).

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
   obtaining inter prediction information of a current block and wraparound information from a bitstream; and
   generating a prediction block of the current block based on the inter prediction information and the wraparound information,
   wherein the wraparound information comprises a first flag specifying whether wraparound motion compensation is enabled for a current picture including the current block,
   wherein, based on at least one of subpictures included in the current picture being treated as a picture and having a width different from a value being derived based on information on a maximum width of a picture in a current video sequence including the current picture, the first flag has a first value specifying that the wraparound motion compensation is disabled for the current picture,
   wherein, based on the first flag having a second value specifying that the wraparound motion compensation is enabled for the current picture, the prediction block is generated by performing the wraparound motion compensation, and
   wherein the wraparound motion compensation is performed based on either boundaries of a current subpicture including the current block or boundaries of a reference picture of the current block, based on whether the current subpicture is treated as a picture.

2. An image encoding method performed by an image encoding apparatus, the image encoding method comprising:
   determining whether wraparound motion compensation is applied for a current block;
   generating a prediction block of the current block by performing inter prediction based on the determination; and
   encoding inter prediction information of the current block and wraparound information for the wraparound motion compensation,
   wherein the wraparound information comprises a first flag specifying whether wraparound motion compensation is enabled for a current picture including the current block,
   wherein, based on at least one of subpictures included in the current picture being treated as a picture and having a width different from a value being derived based on information on a maximum width of a picture in a current video sequence including the current picture, the first flag has a first value specifying that the wraparound motion compensation is disabled for the current picture, and
   wherein the wraparound motion compensation is performed based on either boundaries of a current subpicture including the current block or boundaries of a reference picture of the current block, based on whether the current subpicture is treated as a picture.

3. A non-transitory computer-readable recording medium storing a bitstream generated by the image encoding method of claim 2.

4. A method of transmitting a bitstream generated by an image encoding method, the image encoding method comprising:
   determining whether wraparound motion compensation is applied for a current block;
   generating a prediction block of the current block by performing inter prediction based on the determination; and
   encoding inter prediction information of the current block and wraparound information for the wraparound motion compensation,
   wherein the wraparound information comprises a first flag specifying whether wraparound motion compensation is enabled for a current picture including the current block,
   wherein, based on at least one of subpictures included in the current picture being treated as a picture and having a width different from a value being derived based on information on a maximum width of a picture in a current video sequence including the current picture, the first flag has a first value specifying that the wraparound motion compensation is disabled for the current picture, and wherein the wraparound motion compensation is performed based on either boundaries of a current subpicture including the current block or boundaries of a reference picture of the current block, based on whether the current subpicture is a treated as a picture.

* * * * *